United States Patent
Zhang et al.

(10) Patent No.: US 12,019,864 B2
(45) Date of Patent: Jun. 25, 2024

(54) MULTIMEDIA DATA PLAYING METHOD AND ELECTRONIC DEVICE

(71) Applicant: Huawei Technologies Co., Ltd., Shenzhen (CN)

(72) Inventors: Yanan Zhang, Shenzhen (CN); Xuan Zhou, Shenzhen (CN); Mengdi Liu, Shenzhen (CN); Fei Ye, Wuhan (CN); Guyu Xie, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/293,365

(22) PCT Filed: Oct. 15, 2019

(86) PCT No.: PCT/CN2019/111158
§ 371 (c)(1),
(2) Date: May 12, 2021

(87) PCT Pub. No.: WO2020/098437
PCT Pub. Date: May 22, 2020

(65) Prior Publication Data
US 2022/0004315 A1    Jan. 6, 2022

(30) Foreign Application Priority Data
Nov. 14, 2018 (CN) .......................... 201811355743.5

(51) Int. Cl.
*G06F 3/04886* (2022.01)
*G06F 3/0482* (2013.01)
(Continued)

(52) U.S. Cl.
CPC ........ *G06F 3/04886* (2013.01); *G06F 3/0482* (2013.01); *G06F 3/0484* (2013.01); *G06F 3/1454* (2013.01); *H04M 1/72448* (2021.01)

(58) Field of Classification Search
CPC .............. G06F 3/04817; G06F 3/0482; G06F 3/04845; G06F 3/0488; G06F 1/1647; G06F 1/1677; G06F 3/04886; G06F 1/163; G06F 3/017; G06F 1/1694; G06F 3/014; G06F 21/30; G06F 21/305; G06F 3/01; G06F 3/03543; G06F 16/252; G06F 1/1698;
(Continued)

(56) References Cited

U.S. PATENT DOCUMENTS

2009/0047905 A1* 2/2009 Yang .................... H04R 1/1091
455/41.3
2011/0117971 A1* 5/2011 Kim ...................... G06F 1/1647
455/566
(Continued)

FOREIGN PATENT DOCUMENTS

CN   104978156 A   10/2015
CN   105828139 A    8/2016
(Continued)

*Primary Examiner* — Rayeez R Chowdhury
(74) *Attorney, Agent, or Firm* — Conley Rose, P.C.

(57) ABSTRACT

A method includes displaying N candidate devices, receiving a first selection operation that a user selects a second electronic device from the N candidate devices, and switch multimedia data associated with the first display interface to the second electronic device for playing or displaying the task.

20 Claims, 41 Drawing Sheets

(51) Int. Cl.
*G06F 3/0484* (2022.01)
*G06F 3/14* (2006.01)
*H04M 1/72448* (2021.01)

(58) Field of Classification Search
CPC ...... G06F 1/26; G06F 21/6218; G06F 16/955;
G06F 1/1684; G06F 1/24; G06F 21/31;
G06F 21/42; G06F 21/53; G06F 21/602;
G06F 21/604; G06F 21/629; G06F 21/83;
G06F 3/162; G06F 40/103; G06F 9/547
See application file for complete search history.

(56) References Cited

U.S. PATENT DOCUMENTS

| | | | | |
|---|---|---|---|---|
| 2012/0291060 | A1* | 11/2012 | Relyea | H04N 21/41265 725/25 |
| 2014/0282074 | A1 | 9/2014 | Laukkanen et al. | |
| 2015/0082184 | A1 | 3/2015 | Kim et al. | |
| 2015/0120817 | A1* | 4/2015 | Jeong | G06F 3/1454 709/203 |
| 2015/0188762 | A1* | 7/2015 | Hong | H04L 12/2809 709/208 |
| 2015/0289124 | A1* | 10/2015 | Palin | H04M 1/72412 455/41.2 |
| 2016/0110152 | A1* | 4/2016 | Choi | G06F 3/04817 345/2.3 |
| 2017/0017451 | A1 | 1/2017 | Sathyanarayana Raghu et al. | |

FOREIGN PATENT DOCUMENTS

| | | |
|---|---|---|
| CN | 105892977 A | 8/2016 |
| CN | 106569758 A | 4/2017 |
| CN | 106792024 A | 5/2017 |
| CN | 106936671 A | 7/2017 |
| CN | 106959796 A | 7/2017 |
| CN | 107003818 A | 8/2017 |
| CN | 109660842 A | 4/2019 |
| EP | 2854342 A | 4/2015 |
| EP | 3860132 A1 | 4/2021 |

* cited by examiner

CONT.
FROM

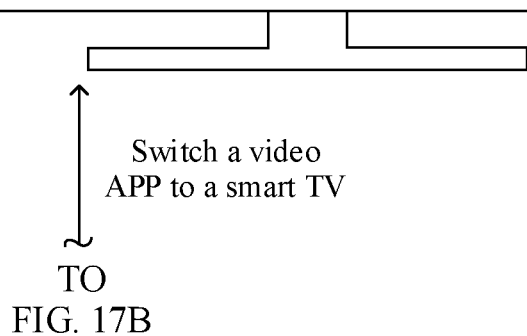
TO
FIG. 17B
FIG. 17A

CONT.
FROM

Open the
WeChat APP TO
———————→ FIG. 17C

MULTIMEDIA DATA PLAYING METHOD AND ELECTRONIC DEVICE

CROSS-REFERENCE TO RELATED APPLICATIONS

This application is a U.S. National Stage of International Patent Application No. PCT/CN2019/111158 filed on Oct. 15, 2019, which claims priority to Chinese Patent Application No. 201811355743.5 filed on Nov. 14, 2018, both of which are hereby incorporated by reference in their entireties.

TECHNICAL FIELD

This application relates to the terminal field, and in particular, to a multimedia data playing method and an electronic device.

BACKGROUND

With the development of smart household technologies, a user or a family usually has a plurality of electronic devices that can communicate with each other. Various electronic devices usually have their own device characteristics. For example, mobile phones have better portability, television screens have better display effects, and speakers have better sound quality and sound effects. To make full use of device characteristics of different electronic devices, the electronic devices may implement interaction of multimedia data between the plurality of devices by using functions such as screen projection, airplay (wireless playing), or Bluetooth.

Using the screen projection function as an example, a user may install screen projection software on a mobile phone, and send multimedia data such as photos and videos on the mobile phone to another controlled device (for example, a smart television) that supports the screen projection function for display. In an implementation, after the user selects the smart television as the controlled device, the mobile phone sends, in real time, data displayed on a screen of the mobile phone to the smart television for display. That is, displayed content on the mobile phone is completely the same as that on the smart television. This screen projection manner is prone to cause disclosure of private information on the mobile phone. In another implementation, after the user selects the smart television as the controlled device, the mobile phone may first prompt, in a form of a list or the like, the user to select an application to be screen-projected. After the user selects a specific application, the mobile phone may screen-project the application selected by the user onto the smart television for display. In this screen projection manner, the user needs to manually set specific to-be-screen-projected content before each screen projection, resulting in cumbersome operations in a screen projection process.

SUMMARY

This application provides a multimedia data playing method and an electronic device, to allow multimedia data in a first electronic device to be conveniently and quickly switched to a second electronic device for playing, thereby reducing an operation in a screen projection process, improving human-computer interaction efficiency, and enhancing intelligence of the electronic devices and friendliness of the electronic devices in interaction with persons.

To achieve the foregoing objectives, the following technical solutions are used in this application.

According to a first aspect, this application provides a multimedia data playing method, including: A first electronic device displays a first display interface; subsequently, the first electronic device may display a first prompt interface, where the first prompt interface includes N (N is an integer greater than 0) candidate devices; and if a first selection operation that a user selects a second electronic device from the N candidate devices is detected, the first electronic device switches only multimedia data associated with the first display interface to the second electronic device for playing.

When the first display interface is an interface of a first application, the multimedia data associated with the first display interface includes one or any combination of the following: data on a display interface of the first application, and data of a video task or data of an audio task on the first display interface; other information (for example, information in a status bar) displayed simultaneously with the first display interface; and multimedia data of a video application on the first electronic device, multimedia data of an audio application on the first electronic device, data displayed on a home screen of the first electronic device, and multimedia data of an application that is running when the first electronic device displays the first display interface.

That is, when an application is running in the first electronic device, the first electronic device may determine the application as an application whose multimedia data needs to be switched to another electronic device for playing, and prompt the user to select a candidate device to play the application. If the user selects a candidate device (that is, the second electronic device), the first electronic device may switch, at a per-application granularity, the multimedia data (for example, audio or displayed data) of the application to the second electronic device for playing, instead of synchronously playing, on the second electronic device and at a per-operating system granularity, multimedia data played on the first electronic device. In this way, the user may select a candidate device for an app when using the app, and further trigger the first electronic device to switch only multimedia data of the app to the second electronic device, to avoid a cumbersome procedure in which the user manually sets to-be-switched content before each device switching. This makes an entire human-computer interaction process more natural and friendly, and improves user experience.

In a possible design method, when the first display interface is the interface of the first application, the first prompt interface includes an identifier of the first application, and the first prompt interface is superimposed on the first display interface. To be specific, the first prompt interface corresponding to the first application is displayed in a superimposing manner when the first display interface of the first application is displayed.

In a possible design method, after the first electronic device displays the first display interface, the foregoing method further includes: In response to the first operation of the user, the first electronic device displays a device switching button; and in this case, that the first electronic device displays the first prompt interface includes: If detecting a second selection operation performed by the user on the device switching button, the first electronic device displays the first prompt interface.

That is, the user may invoke, by performing the first operation, an interface that includes the switching button in the first electronic device. By touching the device switching button, the user may trigger a mobile phone to determine the running first application as an application that can support multimedia data playing across devices, and further to prompt the user to select, for the first application, a candidate device to play multimedia data across devices. This makes an entire human-computer interaction process more natural and friendly, and improves user experience.

In a possible design method, the foregoing method further includes: If detecting the second selection operation performed by the user on the device switching button, the first electronic device may further display a second prompt interface, where the second prompt interface includes M (M is an integer greater than 0) candidate devices; and if the first electronic device receives a third selection operation that the user selects a third electronic device from the M candidate devices, the first electronic device may switch multimedia data of a second application to the third electronic device for playing, where the second application is a video application or an audio application on the first electronic device, or an application that is running when the first display interface is displayed.

That is, in addition to prompting the user to select, for the first application, a candidate device to play multimedia data across devices, the mobile phone may further prompt the user to select, for the second application, a candidate device to play multimedia data across devices. In this way, the user may choose a specific app whose multimedia data is to be switched and a specific candidate device to which the multimedia data is to be switched for running. On these prompt interfaces (for example, a prompt box), the user can determine, through only one selection operation, an app whose multimedia data is to be played across devices and a specific device to play the multimedia data of the app across devices, thereby simplifying a human-computer interaction procedure during multimedia data switching.

In a possible design method, when the first display interface is the interface of the first application, the first prompt interface may include the identifier of the first application, and the second prompt interface includes an identifier of the second application; the first prompt interface is superimposed on the first display interface, the second prompt interface is superimposed on the first display interface, and the first prompt interface and the second prompt interface are displayed simultaneously.

In a possible design method, the first operation may be an operation of opening a drop-down menu, where the drop-down menu includes the device switching button; or the first operation may be an operation of opening a pull-up menu, where the pull-up menu includes the device switching button; or the first operation may be an operation of opening a side-pull menu, where the side-pull menu includes the device switching button; or the first operation is an operation of opening a floating menu, where the floating menu includes the device switching button.

In a possible design method, when the first display interface is the interface of the first application, the first prompt interface may include a name of a video task or a name of an audio task on the first display interface, for example, a video **. In this case, that the first electronic device switches only multimedia data associated with the first display interface to the second electronic device for playing includes: The first electronic device switches the multimedia data of the video task or the multimedia data of the audio task to the second electronic device for playing. In this way, the first electronic device may further switch, at a per-task granularity, a video task or an audio task of the first application to another electronic device. In this case, data that is on the first display interface and that is irrelevant to the video task or the audio task does not need to be switched to the second electronic device for playing.

In a possible design method, that the first electronic device displays the first prompt interface includes: If detecting a candidate device to which multimedia data can be switched for playing, the first electronic device automatically displays the first prompt interface. That is, when running different applications, the first electronic device may dynamically generate prompt interfaces corresponding to the applications and push the prompt interfaces to the user, to prompt the user that an operation of playing multimedia data across devices can be performed on the currently running applications.

Alternatively, before the first electronic device displays the first prompt interface, the foregoing method further includes: If detecting a candidate device to which multimedia data can be switched for playing, the first electronic device automatically generates the first prompt interface; and when detecting an operation that the user opens a message notification bar, the first electronic device may display the first prompt interface in the message notification bar.

In a possible design method, the message notification bar may further include a second prompt interface, where the second prompt interface includes M (M is an integer greater than 0) candidate devices; and the foregoing method further includes: The first electronic device receives a third selection operation that the user selects a third electronic device from the M candidate devices, and in response to the third selection operation, the first electronic device switches multimedia data of a second application to the third electronic device for playing. That is, the first electronic device may dynamically generate prompt interfaces separately corresponding to a plurality of applications, and push the prompt interfaces to the user. After selecting a candidate device on a specific prompt interface, the user may determine an app whose multimedia data is to be played across devices this time and a specific device to play the multimedia data of the app across devices, thereby simplifying a human-computer interaction procedure during multimedia data switching.

In a possible design method, after the first electronic device switches only the multimedia data associated with the first display interface to the second electronic device for playing, the foregoing method further includes: The first electronic device displays a notification, where the notification is used to indicate that multimedia data in the first electronic device is being played on the second electronic device.

For example, the notification may include, in addition to the second electronic device, a candidate device to which the multimedia data can be switched for playing.

In a possible design method, after the first electronic device switches only the multimedia data associated with the first display interface to the second electronic device for playing, the foregoing method further includes: The first electronic device displays a second display interface of the second application; and further, the first electronic device switches multimedia data associated with the second display interface to the third electronic device for playing. That is, the first electronic device may separately switch multimedia data of a plurality of applications to different electronic devices for playing.

In a possible design method, when the first display interface is the home screen of the first electronic device, the first electronic device may synchronize, between the first electronic device and the second electronic device, data displayed on the home screen (which may also be referred to as a desktop) and other multimedia data of all running applications, to implement mirrored display. In this way, multimedia data playing across devices at a per-operating system granularity is implemented.

In a possible design method, the first electronic device may also be used as a candidate device selected by the user. In this case, the foregoing method further includes: The first electronic device receives a switch and play instruction sent by the second electronic device; and if the first electronic device is in an unlocked state, the first electronic device responds to the switch and play instruction and plays multimedia data from the second electronic device; or if the first electronic device is in a screen locked state, the first electronic device displays, on a lock screen interface, a cross-device playing notification that is from the second electronic device.

In a possible design method, the foregoing method further includes: After the first electronic device displays the first prompt interface, if the first electronic device does not receive, within a preset time, an operation performed by the user on the first prompt interface, the first electronic device may hide the first prompt interface; or the first electronic device may convert the data displayed on the first display interface into audio data, and switch the audio data obtained through conversion to the second electronic device for playing; or after the first electronic device switches the multimedia data associated with the first display interface to the second electronic device for playing, the first electronic device may continue to display the first display interface or display an interface other than the first display interface.

According to a second aspect, this application provides an electronic device, including a touchscreen, a communications interface, one or more processors, a memory, and one or more computer programs, where the processor is coupled to the touchscreen, the communications interface, a positioning apparatus, and the memory. The one or more computer programs are stored in the memory. When the electronic device runs, the processor executes the one or more computer programs stored in the memory to enable the electronic device to perform the multimedia data playing method according to any one of the foregoing design methods.

According to a third aspect, this application provides a computer storage medium, including a computer instruction. When the computer instruction is run in an electronic device, the electronic device is enabled to perform the multimedia data playing method according to any one of the foregoing design methods in the first aspect.

According to a fourth aspect, this application provides a computer program product. When the computer program product is run in an electronic device, the electronic device is enabled to perform the multimedia data playing method according to any one of the implementations of the first aspect.

It can be understood that the terminal in the second aspect, the computer storage medium in the third aspect, and the computer program product in the fourth aspect that are provided above are all configured to perform the corresponding methods provided above. Therefore, for beneficial effects that can be achieved by the terminal, the computer storage medium, and the computer program product, refer to beneficial effects in the corresponding methods provided above. Details are not described herein.

DESCRIPTION OF EMBODIMENTS

The following describes the implementations of the embodiments in detail with reference to accompanying drawings.

An embodiment of this application provides a multimedia data playing method that can be applied to a device group

Figure 1:
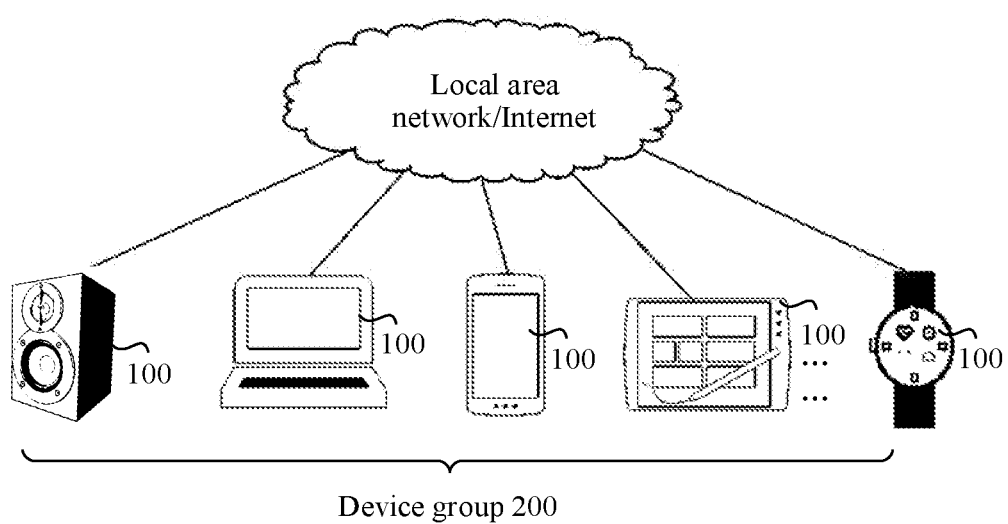
FIG. 1 is a schematic architectural diagram of a device group according to an embodiment of this application.
Figure 2A:
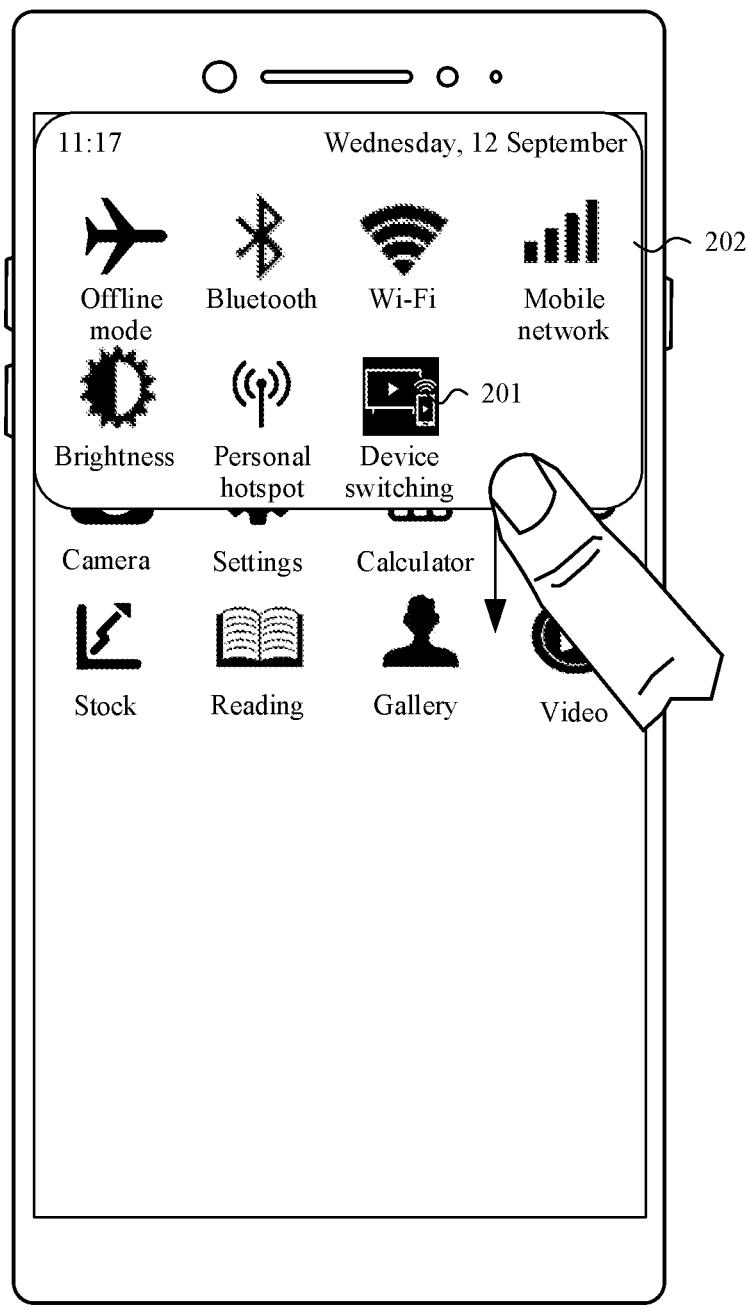
FIG. 2(a) to FIG. 2(d) are a schematic diagram 1 of an application scenario of a multimedia data playing method according to an embodiment of this application.
Figure 2B:
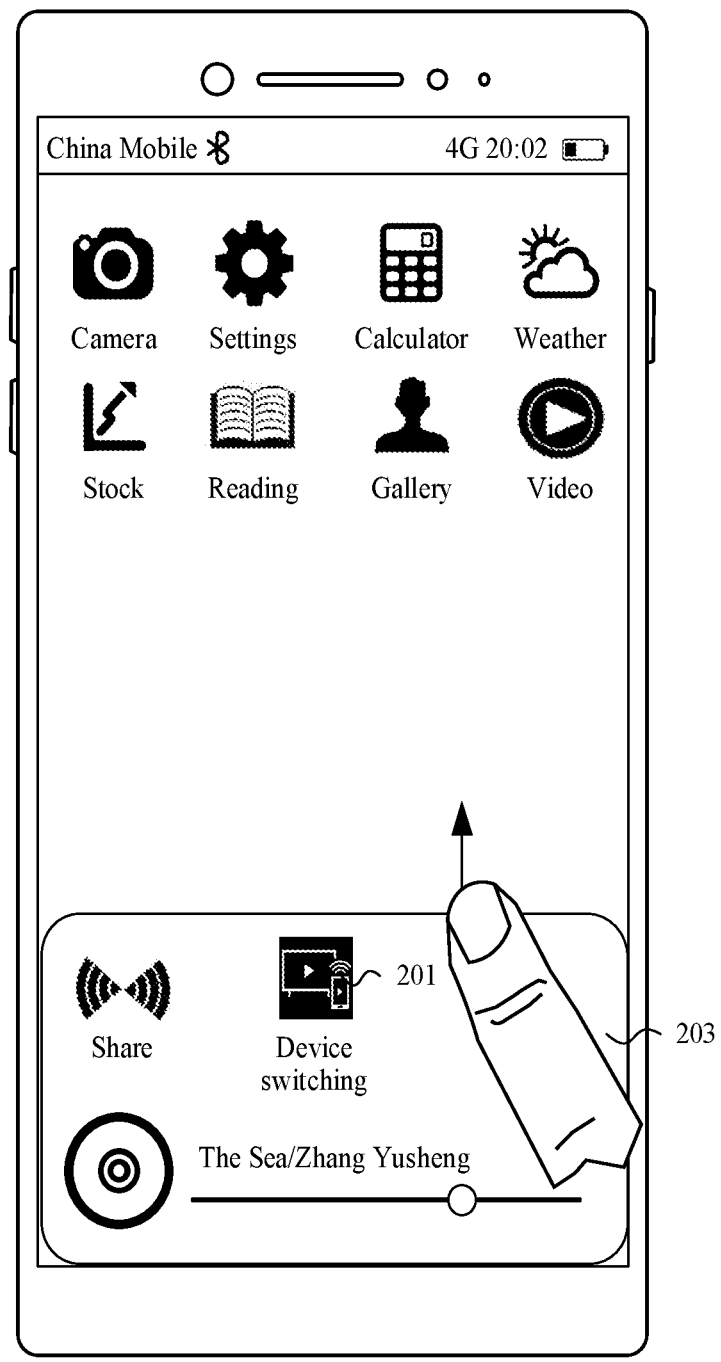
Figure 2C:
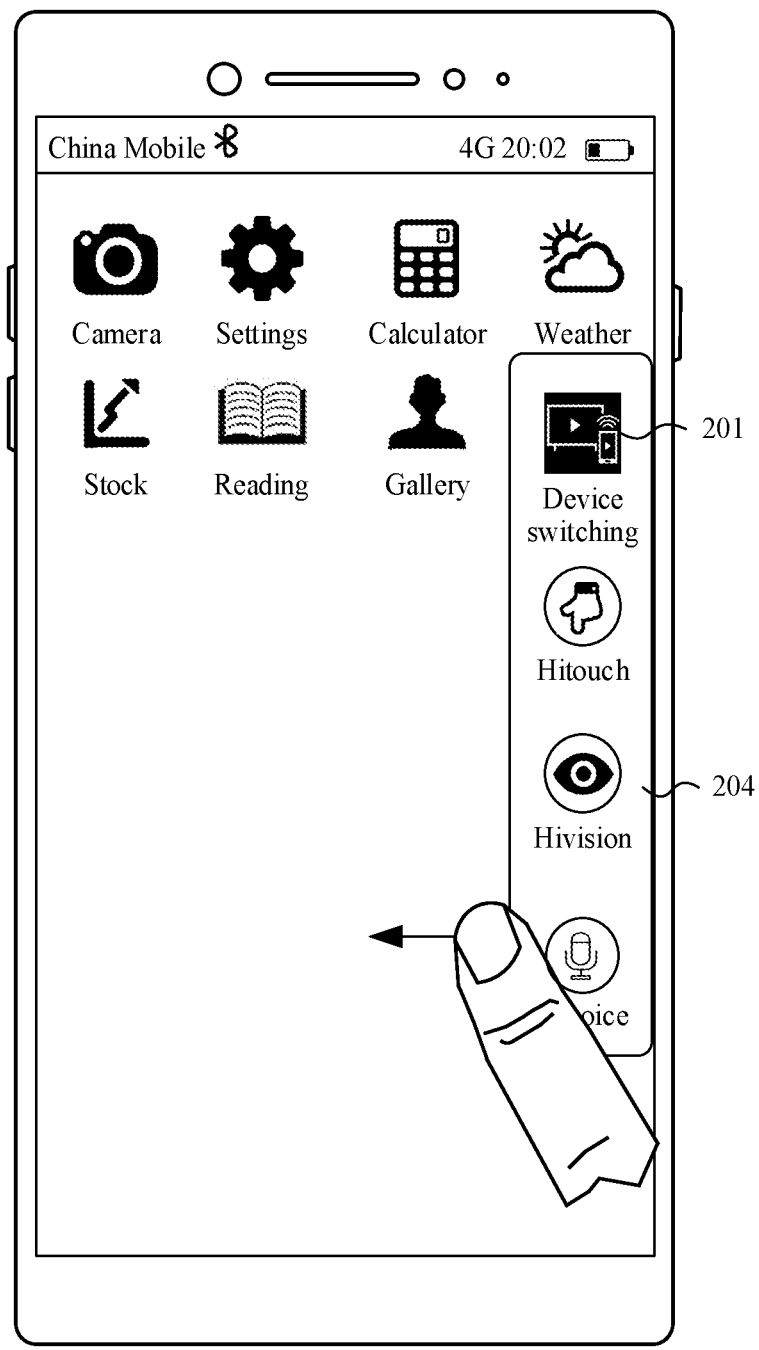
Figure 2D:
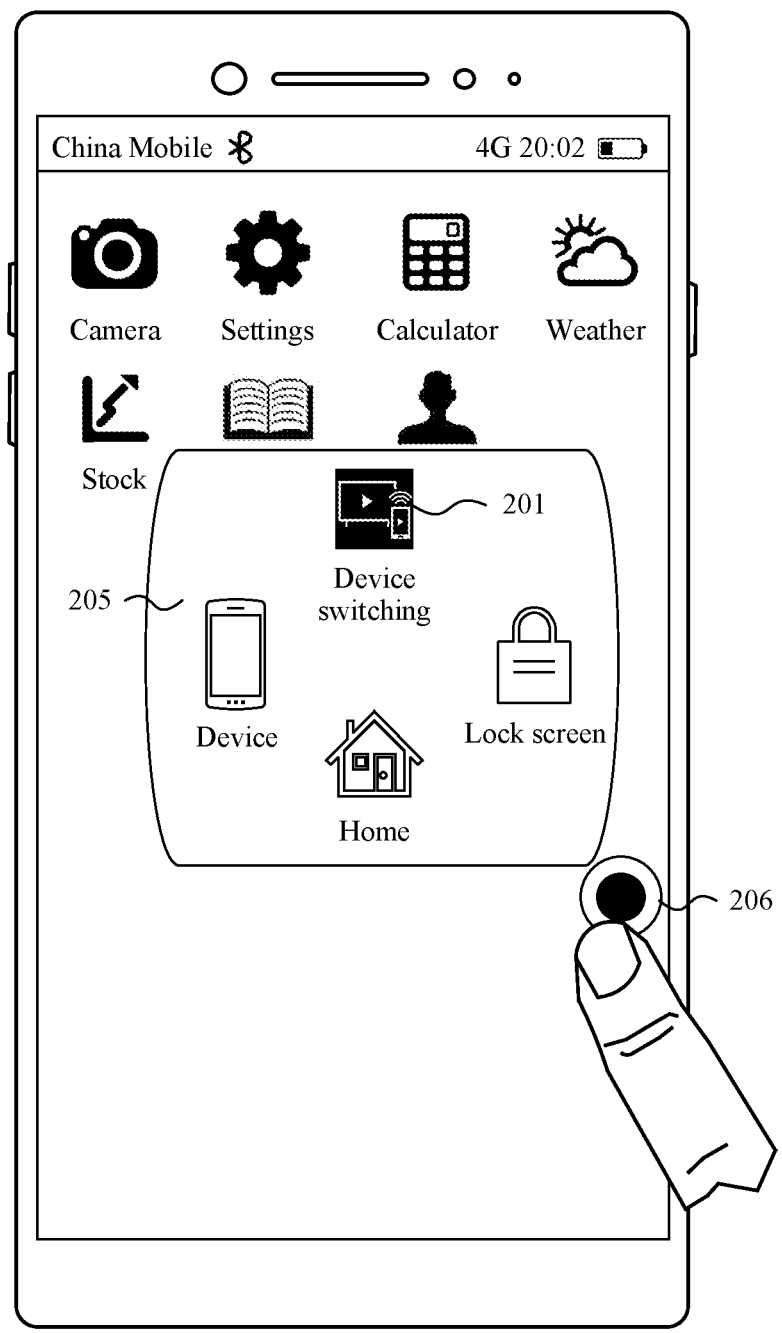

200 shown in FIG. 1. All electronic devices 100 in the device group 200 may communicate with each other.

For example, a mobile phone, a tablet computer, a smart speaker, a smartwatch, and a notebook computer of a user may be used as the device group 200. When the user logs in to the mobile phone, the tablet computer, the smart speaker, the smartwatch, and the notebook computer by using a same account, the mobile phone, the tablet computer, the smart speaker, and the notebook computer are in a local area network (Local Area Network, LAN), and devices in the local area network can communicate with each other.

For another example, the electronic devices 100 may also form a local area network in a wireless communication manner (for example, Bluetooth, a Wi-Fi network, or a ZigBee network). For example, the user may add the mobile phone, the tablet computer, the smart speaker, and the notebook computer to a Wi-Fi network named "1234". All electronic devices 100 in the Wi-Fi network form a local area network, and all the devices in the local area network form a device group 200.

Certainly, in addition to a local area network, the electronic devices 100 in the device group 200 may also be interconnected by using a cellular network, or the electronic devices 100 may further be interconnected by using a transfer device (for example, a USB data cable or a dock device), to implement a function of communication between the electronic devices 100 in the device group 200. This is not limited in this embodiment of the present invention.

In this embodiment of this application, a device switching button may be disposed in the electronic device 100 in advance, and the device switching button may be used for switching one or more pieces of multimedia data in the electronic device 100 to another electronic device in the device group 200 for playing. The multimedia data may include one or any combination of the following: text data, image data, animation data, audio data, or video data. The multimedia data may be data generated when the electronic device runs an app, for example, displayed data and audio data.

A mobile phone is used as an example of the electronic device 100. As shown in FIG. 2(*a*), a device switching button 201 may be disposed on a drop-down menu 202. If the mobile phone detects that a user starts to perform a pull-down operation from the top of a touchscreen, the mobile phone may respond to the pull-down operation, and expand the drop-down menu 202 from the top of the touchscreen. The drop-down menu 202 may include the device switching button 201.

Alternatively, as shown in FIG. 2(*b*), the device switching button 201 may be disposed on a pull-up menu 203 of the mobile phone. If the mobile phone detects that the user starts to perform a pull-up operation from the bottom of the touchscreen, the mobile phone may respond to the pull-up operation, and expand the pull-up menu 203 from the bottom of the touchscreen. The pull-up menu 203 may include the device switching button 201.

Alternatively, as shown in FIG. 2(*c*), the device switching button 201 may be disposed on a side-pull menu 204 of the mobile phone. If the mobile phone detects that the user starts to perform a sliding operation from a side of the touchscreen, the mobile phone may respond to the sliding operation, and expand the side-pull menu 204 from the side of the touchscreen. The side-pull menu 204 may include the device switching button 201.

Alternatively, as shown in FIG. 2(*d*), the device switching button 201 may be disposed on a floating menu 205 of the mobile phone. After detecting that the user touches a floating button 206 displayed on the touchscreen, the mobile phone may display the floating menu 205 including the device switching button 201.

Figure 3:
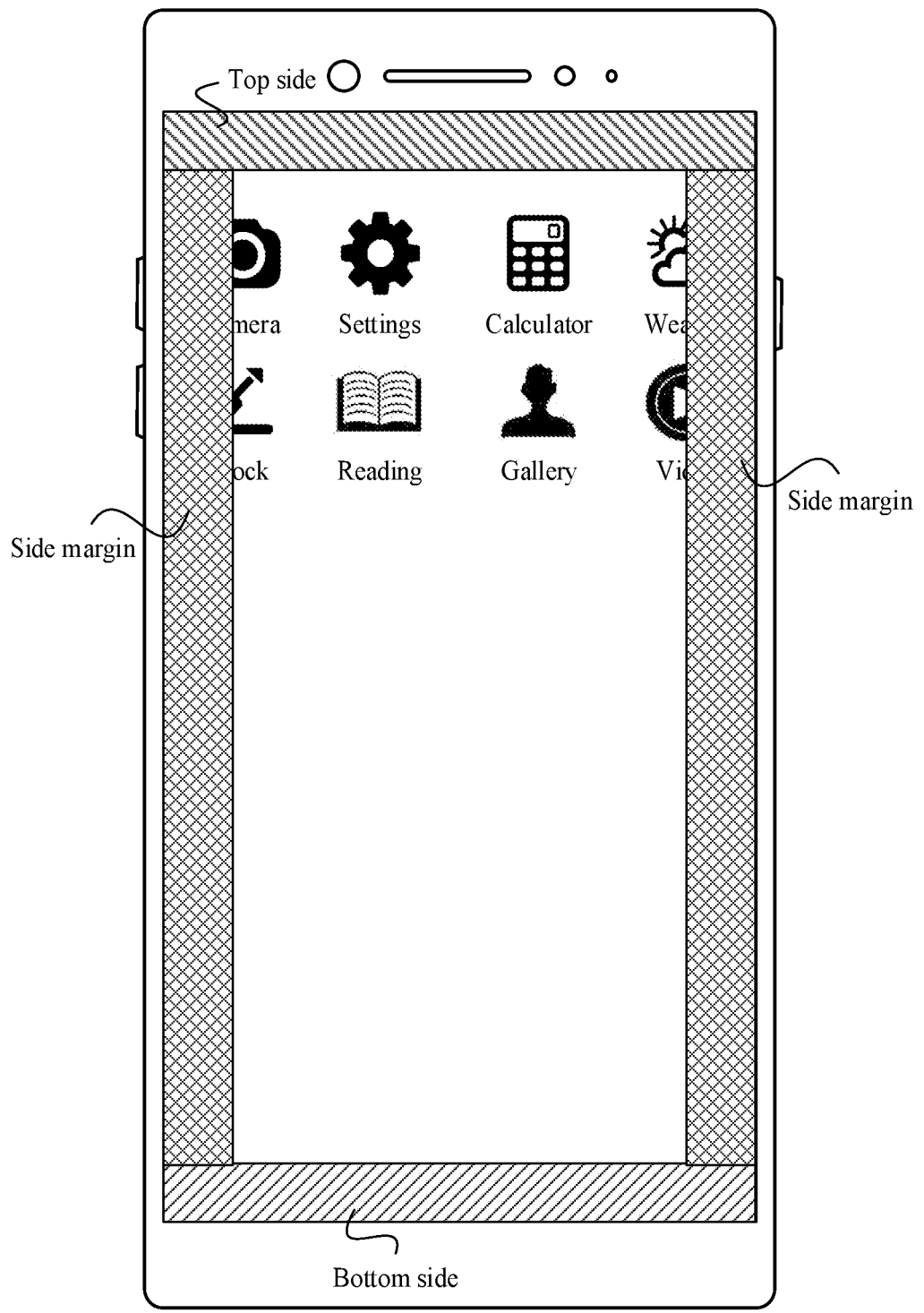
FIG. 3 is a schematic diagram 2 of an application scenario of a multimedia data playing method according to an embodiment of this application.

It should be noted that concepts such as the bottom, the top, and the side of the touchscreen described in this embodiment of this application are relative. Usually, as shown in FIG. 3, a rectangular touchscreen includes four areas close to a boundary line: the top, the bottom, and two sides. The bottom usually refers to a position close to the bottom of the touchscreen, and the top usually refers to a position close to the top of the touchscreen. The bottom and the top of the touchscreen usually refer to a lower part and an upper part respectively when the mobile phone is placed as shown in FIG. 2(*a*) to FIG. 2(*d*) or FIG. 3.

In addition, the device switching button 201 may be a virtual key or a physical key. This is not limited in the embodiments of this application.

For example, when the user uses various apps on the mobile phone, various types of multimedia data may be generated. For example, when a video app is run, the mobile phone may display video data to the user; when a music app is run, the mobile phone may play audio data to the user; and when a browser app is run, the mobile phone may display data such as text and a picture to the user. When using an app, if the user expects to switch multimedia data output by the current app to another electronic device for playing, the user may touch the device switching button 201 on the drop-down menu 202 (or the pull-up menu 203, the side-pull menu 204, or the floating menu 205).

The mobile phone usually can record, in real time, an app or a task (task) that is running. For example, when running an application, the mobile phone may establish a corresponding application stack. Usually, content at the top of the application stack is content that is currently being run and displayed on the mobile phone. For example, when an application A is running, a plurality of tasks may be generated in an application stack of the application A. The mobile phone executes each task starting from the top of the application stack, and outputs an execution result of each task to the touchscreen of the mobile phone for display. When the mobile phone displays the drop-down menu 202, a task of displaying the drop-down menu 202 may also be placed to the top of the application stack. In this case, an app (or a task) that is in the application stack and that is adjacent to the task of displaying the drop-down menu 202 is an application (or a task) that is being used by the user before the mobile phone displays the drop-down menu 202. Therefore, the mobile phone may determine the app or the task adjacent to the task of displaying the drop-down menu 202 in the application stack as an app or a task that the user expects to switch to another device for execution. Further, the mobile phone may prompt the user to switch multimedia data output by the app (or the task) to another electronic device for playing.

For ease of description, in subsequent embodiments, an app (or a task) that is prompted by the mobile phone to the user and whose multimedia data can be switched to another electronic device for playing across devices may be referred to as a target app (or a target task).

Figure 4A:
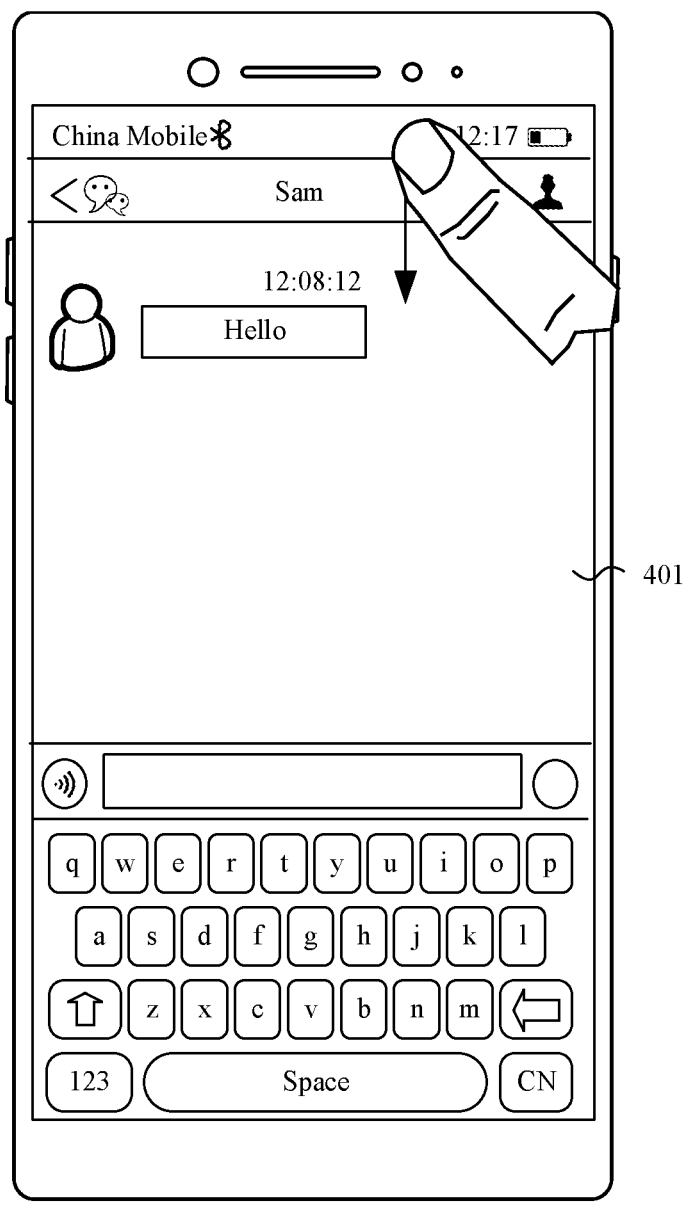
FIG. 4(a) to FIG. 4(c) are a schematic diagram 3 of an application scenario of a multimedia data playing method according to an embodiment of this application.
Figure 4B:
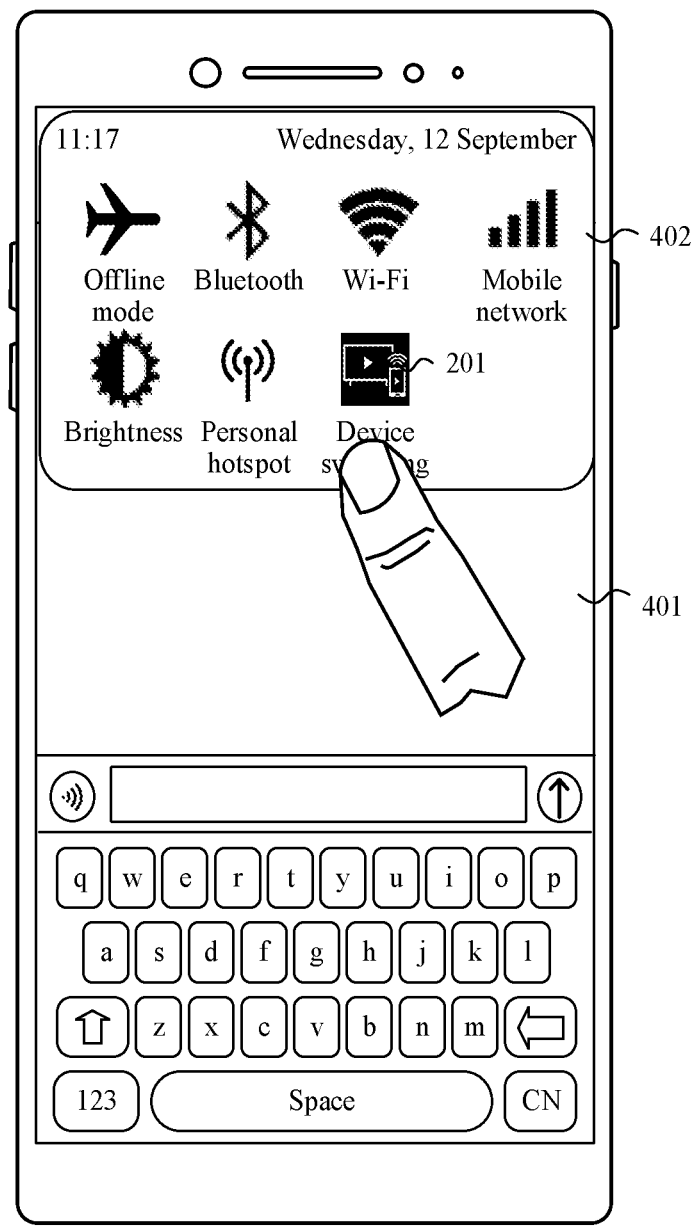

For example, after the mobile phone detects an operation that the user starts a WeChat app, the mobile phone may push the WeChat app to the top of an application stack to start running. In this case, as shown in FIG. 4(*a*), an interface displayed on the mobile phone is an interface 401 of the WeChat app. If the mobile phone detects that the user performs a pull-down operation on the interface 401 of the WeChat app, the mobile phone may push a task of displaying a drop-down menu to the top of the application stack to start running. In this case, as shown in FIG. 4(b), the mobile phone may display a drop-down menu 402 on the interface 401 of the WeChat app in a superimposing manner, where the drop-down menu 402 includes the device switching button 201.

Figure 4C:
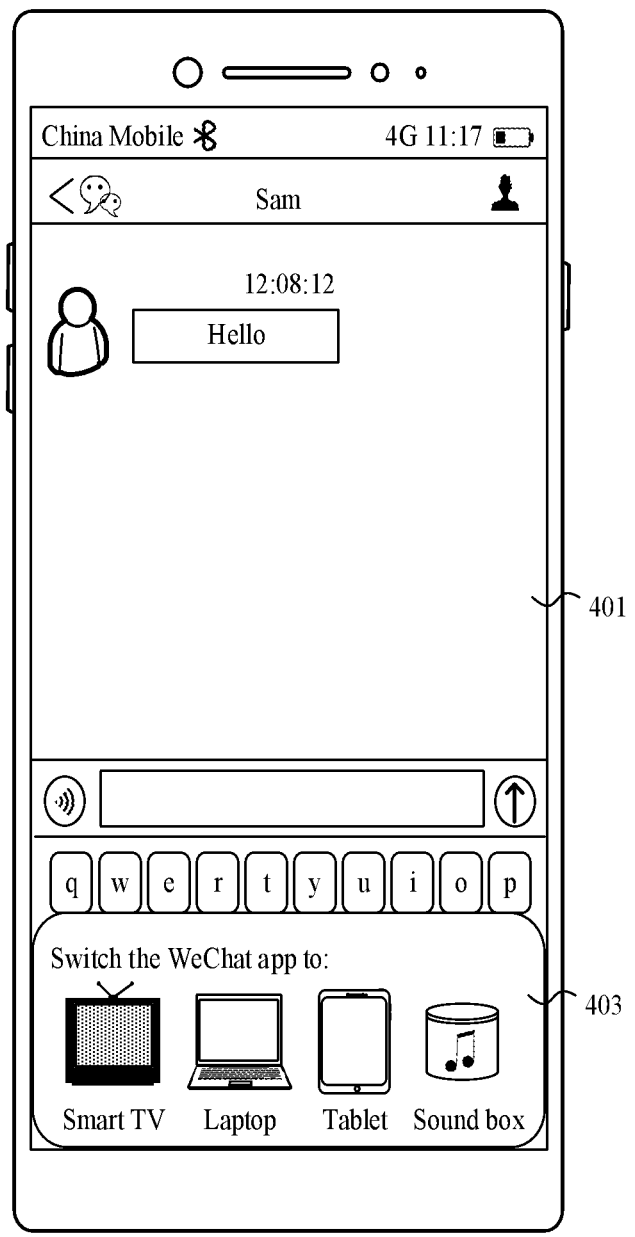

If the mobile phone detects that the user touches the device switching button 201, because the user is using the WeChat app before touching the device switching button 201, and the user probably expects to switch multimedia data output by the WeChat app (that is, the target app) to another device for playing, then the mobile phone may display a prompt box 403 indicating playing across devices for the WeChat app, as shown in FIG. 4(c). The prompt box 403 includes one or more candidate devices that support running of the WeChat app, and all these candidate devices and the mobile phone belong to the same device group 200.

In this case, if the mobile phone detects that the user selects a specific candidate device (for example, a smart television 404) in the prompt box 403, the mobile phone may switch the multimedia data (for example, a chat interface for a contact) output by the WeChat app to the smart television 404 for continuous playing. For example, the mobile phone may send displayed data generated by the running WeChat app to the smart television 404 for continuous display. A specific method for switching, by the mobile phone, multimedia data output by a specific app to another electronic device is described in detail in the subsequent embodiments. Therefore, details are not described herein.

It can be learned that in this embodiment of this application, if a first electronic device (for example, the foregoing mobile phone) detects that a user touches a device switching button, it indicates that the user has a requirement of switching multimedia data in the first electronic device to another electronic device for playing. In this case, the first electronic device may prompt the user to switch multimedia data output by one or more target apps that are recently used to a specific candidate device for playing. If the user selects a second electronic device from candidate devices, the mobile phone may switch the multimedia data output by the target app from the first electronic device to the second electronic device for playing across devices.

That is, after detecting that the user has a requirement of switching a device for playing multimedia data, the mobile phone may automatically determine, for the user, a target app that can be switched to another electronic device for playing across devices, and prompt the user to switch multimedia data output by the target app. This avoids a cumbersome procedure in which the user manually sets a target app before each device switching. In this way, in a process of using a specific app, the user may trigger, by touching the device switching button, the mobile phone to determine the app as a target app that can support multimedia data playing across devices, and further to prompt the user to select, for the target app, a candidate device that can play multimedia data across devices. This makes an entire human-computer interaction process more natural and friendly, and improves user experience.

For example, the electronic device 100 in the foregoing device group 200 may be specifically an electronic device such as a mobile phone, a tablet computer, a smart speaker, a smart television, a notebook computer, an ultra-mobile personal computer (Ultra-mobile Personal Computer, UMPC), a handheld computer, a netbook, a personal digital assistant (Personal Digital Assistant, PDA), a wearable electronic device, or a virtual reality device.

Figure 5:
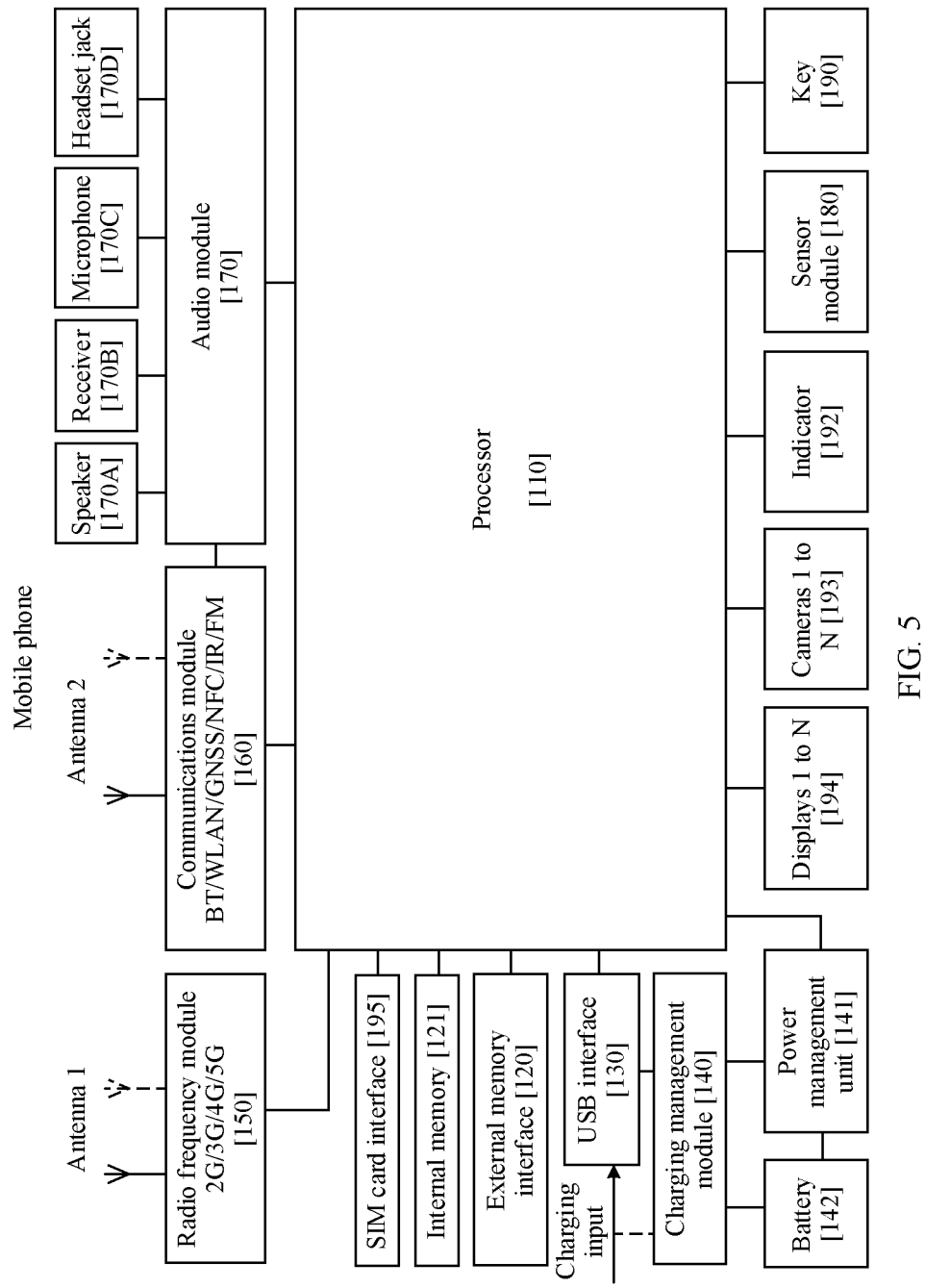
FIG. 5 is a schematic structural diagram 1 of an electronic device according to an embodiment of this application.

An example is used in which a mobile phone is used as the electronic device 100. FIG. 5 is a schematic structural diagram of the mobile phone.

The mobile phone may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like.

It should be understood that a structure illustrated in this embodiment of the present invention does not constitute a specific limitation on the mobile phone. In some other embodiments of this application, the mobile phone may include components more or fewer than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural network processor (neural-network Processing Unit, NPU), and/or the like. Different processing units may be independent devices, or may be integrated into one or more processors.

The controller may be a nerve center and a command center of the mobile phone. The controller may generate an operation control signal according to instruction operation code and a timing signal, to complete control of fetching an instruction and executing an instruction.

The memory may further be disposed in the processor 110 and is configured to store an instruction and data. In some embodiments, the memory in the processor 110 is a cache. The memory may store an instruction or data that has just been used or cyclically used by the processor 110. If the processor 110 needs to use the instruction or the data again, the instruction or the data may be directly invoked from the memory, which avoids repeated access, reduces a waiting time of the processor 110, and therefore improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including one serial data line (serial data line, SDA) and one serial clock line (derail clock line, SCL). In some embodiments, the processor 110 may include a plurality of groups of I2C buses. The processor 110 may be separately coupled to a touch sensor 180K, a charger, a camera flash, the camera 193, and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the mobile phone.

The I2S interface may be used for audio communication. In some embodiments, the processor 110 may include a plurality of groups of I2S buses. The processor 110 may be coupled to the audio module 170 by using the I2S bus, thereby implementing communication between the processor 110 and the audio module 170. In some embodiments, the audio module 170 may send an audio signal to the wireless communications module 160 by using the I2S interface, thereby implementing a function of answering a call through a Bluetooth headset.

The PCM interface may also be used for audio communication, sampling, quantizing, and encoding an analog signal. In some embodiments, the audio module 170 and the wireless communications module 160 may be coupled by using the PCM bus interface. In some embodiments, the audio module 170 may also send an audio signal to the wireless communications module 160 by using the PCM interface, thereby implementing the function of answering a call through a Bluetooth headset. Both the I2S interface and the PCM interface may be used for audio communication.

The UART interface is a universal serial data bus used for asynchronous communication. The bus may be a bidirectional communications bus that converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 by using the UART interface, thereby implementing a Bluetooth function. In some embodiments, the audio module 170 may send an audio signal to the wireless communications module 160 by using the UART interface, thereby implementing a function of playing music through a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, thereby implementing a photographing function of the mobile phone. The processor 110 communicates with the display 194 by using the DSI interface, thereby implementing a display function of the mobile phone.

The GPIO interface may be configured by software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may also be configured as an I2C interface, an I2S interface, a UART interface, an MIPI interface, or the like.

The USB interface 130 is an interface that conforms to USB standard specifications, and may be specifically a Mini USB interface, a Micro USB interface, a USB Type C interface, or the like. The USB interface 130 may be configured to connect to a charger to charge the mobile phone, or may be configured to transmit data between the mobile phone and a peripheral device. The USB interface 130 may also be configured to connect to a headset to play audio through the headset. The interface may be further configured to connect to another electronic device, for example, an AR device.

It should be understood that an interface connection relationship between the modules illustrated in this embodiment of the present invention is merely an example for description, and does not constitute a limitation on a structure of the mobile phone. In some other embodiments of this application, the mobile phone may alternatively use an interface connection manner different from those in the foregoing embodiment or a combination of a plurality of interface connection manners.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to send and receive an electromagnetic wave signal. Each antenna in the mobile phone may be configured to cover one or more communications frequency bands. Different antennas may be multiplexed to improve utilization of the antennas. For example, the antenna 1 may be multiplexed into a diversity antenna used in a wireless local area network. In some other embodiments, the antenna may be used in combination with a tuning switch.

The mobile communications module 150 may provide a wireless communications solution that is applied to the mobile phone and that includes 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transfer the electromagnetic wave to the modem processor for demodulation. The mobile communications module 150 may also amplify a signal modulated by the modem processor, and convert the signal into an electromagnetic wave and radiate the electromagnetic wave out by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is sent to the application processor. The application processor outputs a sound signal by using an audio device (not limited to the loudspeaker 170A, the receiver 170B, and the like), or displays an image or a video by using the display 194. In some embodiments, the modem processor may be an independent device. In some other embodiments, the modem processor may be independent of the processor 110, and be disposed in a same device with the mobile communications module 150 or another functional module.

The wireless communications module 160 may provide a wireless communications solution that is applied to the mobile phone and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field wireless communication technology (near field communication, NFC), an infrared (infrared, IR) technology, and the like. The wireless communications module 160 may be one or more devices integrating at least one communications processing module. The wireless communications module 160 receives an electromagnetic wave by using the antenna 2, performs frequency modulation and filtering processing on an electromagnetic wave signal, and sends a processed signal to the processor 110. The wireless communications module 160 may also receive a to-be-sent signal from the processor 110, perform frequency modulation and amplification on the signal, and convert the signal into an electromagnetic wave and radiate the electromagnetic wave out by using the antenna 2.

In some embodiments, in the mobile phone, the antenna 1 is coupled to the mobile communications module 150, and the antenna 2 is coupled to the wireless communications module 160, so that the mobile phone can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The mobile phone implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a Miniled, a MicroLed, a Micro-oLed, a quantum dot light-emitting diode (quantum dot light emitting diodes, QLED), and the like. In some embodiments, the mobile phone may include one or N displays 194, where N is a positive integer greater than 1.

The mobile phone may implement a photographing function by using the ISP, the camera 193, the video codec, the GPU, the display 194, the application processor, and the like.

The ISP is configured to process data fed back by the camera 193. For example, during photographing, a shutter is opened, light is transferred to a photosensitive element of a camera by using a lens, an optical signal is converted into an electrical signal, and the photosensitive element of the camera sends the electrical signal to an ISP for processing, so that the electrical signal is converted into an image visible to naked eyes. The ISP may also perform algorithm optimization on image noise, brightness, and a skin color. The ISP may also optimize parameters such as exposure and a color temperature of a shooting scenario. In some embodiments, the ISP may be disposed in the camera 193.

The camera 193 is configured to capture a static image or a video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then sends the electrical signal to the ISP to convert the electrical signal into a digital image signal. The ISP outputs the digital image signal to the DSP for processing. The DSP converts the digital image signal into an image signal in a standard format, such as RGB and YUV. In some embodiments, the mobile phone may include one or N cameras 193, where N is a positive integer greater than 1.

The digital signal processor is configured to process a digital signal, and may process another digital signal in addition to a digital image signal. For example, when the mobile phone selects a frequency, the digital signal processor is configured to perform Fourier transform or the like on frequency energy.

The video codec is configured to compress or decompress a digital video. The mobile phone may support one or more types of video codecs. In this way, the mobile phone may play or record videos in a plurality of encoding formats, for example, moving picture experts group (moving picture experts group, MPEG) 1, MPEG 2, MPEG 3 and MPEG 4.

The NPU is a neural network (neural-network, NN) computing processor. By referring to a structure of a biological neural network, for example, referring to a mode of transmission between neurons in a human brain, the NPU quickly processes input information, and may further perform self-learning continuously. By using the NPU, an application such as intelligent cognition of the mobile phone may be implemented, for example, image recognition, face recognition, voice recognition, and text understanding.

The external memory interface 120 may be configured to connect to an external memory card, for example, a Micro SD card, to extend a storage capability of the mobile phone. The external memory card communicates with the processor 110 by using the external memory interface 120, to implement a data storage function. For example, files such as music and videos are stored in the external memory card.

The internal memory 121 may be configured to store computer executable program code, and the executable program code includes an instruction. The processor 110 executes various function applications and data processing of the mobile phone by running the instruction stored in the internal memory 121. The internal memory 121 may include a program storage area and a data storage area. The program storage area may store an operating system, an application program required by at least one function (such as a sound playing function and an image playing function), and the like. The data storage area may store data (such as audio data and a phone book) created when the mobile phone is used, and the like. In addition, the internal memory 121 may include a high-speed random access memory, and may further include a nonvolatile memory, for example, at least one magnetic disk storage device, a flash storage device, and universal flash storage (universal flash storage, UFS).

The mobile phone may implement an audio function by using the audio module 170, the loudspeaker 170A, the receiver 170B, the microphone 170C, the headset jack 170D, the application processor, and the like, such as music playing and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The loudspeaker 170A, also referred to as a "speaker", is configured to convert an audio electrical signal into a sound signal. A user may listen to music or answer a hands-free call by using the loudspeaker 170A of the mobile phone.

The receiver 170B, also referred to as an "earpiece", is configured to convert an audio electrical signal into a sound signal. When the mobile phone receives a call or a voice message, a user may listen to a speech by placing the receiver 170B close to an ear.

The microphone 170C, also referred to as a "microphone" or a "microphone", is configured to convert a sound signal into an electrical signal. When making a call or sending a voice message, a user may speak after moving the microphone 170C close to the mouth, and a sound signal is input to the microphone 170C. At least one microphone 170C may be disposed in the mobile phone. In some other embodiments, two microphones 170C may be disposed in the mobile phone, and in addition to collecting a sound signal, a noise reduction function may be further implemented. In some other embodiments, three, four, or more microphones 170C may be alternatively disposed in the mobile phone, to implement functions such as collecting a sound signal, reducing noise, identifying a sound source, and implementing a directional recording function.

The headset jack 170D is configured to connect to a wired headset. The headset jack 170D may be the USB interface 130, or may be a 3.5 mm standard interface of an open mobile terminal platform (open mobile terminal platform, OMTP), or a standard interface of the cellular telecommunications industry association of the USA (cellular telecommunications industry association of the USA, CTIA).

The sensor module 180 may include a pressure sensor, a gyro sensor, a barometric pressure sensor, a magnetic sensor, an acceleration sensor, a distance sensor, a proximity light sensor, a fingerprint sensor, a temperature sensor, a touch sensor, an ambient light sensor, a bone conduction sensor, and the like.

Certainly, the mobile phone may also include the charging management module 140, the power management module 141, the battery 142, the key 190, the indicator 192, one or more SIM card interfaces, and the like. This is not limited in the embodiments of this application.

The following describes in detail a multimedia data playing method provided in the embodiments of this application with reference to the accompanying drawings.

In some embodiments of this application, when a user uses a first electronic device (for example, a mobile phone), if the user expects to switch multimedia data played on the mobile phone to another device (for example, a smart television) for playing, the user may find the device switching button 201 by using some fixed entries. For example, these fixed entries may be the drop-down menu 202, the pull-up menu 203, the side-pull menu 204, the floating menu 205, or the like that are shown in FIG. 2(*a*) to FIG. 2(*d*). This is not limited in the embodiments of this application.

Usually, the user can access the foregoing fixed entries when the mobile phone runs any app. As shown in FIG. 4(*a*) and FIG. 4(*b*), when the mobile phone runs the WeChat app in the foreground, the user may trigger, by inputting a pull-down operation, the mobile phone to display the drop-down menu. Subsequently, if the mobile phone detects that the user touches the device switching button 201 on the drop-down menu, the mobile phone may query for an application that is running on the mobile phone before the drop-down menu is displayed. For example, the mobile phone may query an application stack and find that an app adjacent to a task of displaying the drop-down menu is the WeChat app. That is, the WeChat app is an application that is being used by the user before the mobile phone displays the drop-down menu.

That is, in a process of using the WeChat app, the user invokes the drop-down menu, and touches the device switching button 201 on the drop-down menu. In this case, the user's intention of touching the device switching button 201 is probably to switch the multimedia data output by the WeChat app to another device for playing. Further, as shown in FIG. 4(*c*), the mobile phone may automatically determine the WeChat app as a target app, and display the prompt box 403 indicating playing across devices for the WeChat app. The prompt box 403 includes one or more candidate devices.

For example, after determining the WeChat app as the target app, the mobile phone may query for group members that are specifically included in a device group 200 in which the mobile phone is currently located. For example, after the user connects the mobile phone, a tablet computer, a smart television, and a smart speaker to a Wi-Fi network named "1234", the mobile phone, the tablet computer, the smart television, and the smart speaker form a device group 200. In this case, after determining the WeChat app as the target app, the mobile phone may find, by query, that group members connected to the Wi-Fi network named "1234" also include the tablet computer, the smart television, and the smart speaker. Further, the mobile phone may display all these group members as candidate devices in the prompt box 403, so that the user can select a candidate device to which the WeChat app is to be switched for continuous running. Alternatively, the mobile phone may obtain distances between the mobile phone and these group members, and further determine a device whose distance from the mobile phone is less than a distance threshold as a candidate device.

Alternatively, after finding, by query, one or more group members specifically included in the device group 200 in which the mobile phone is located, the mobile phone may further determine which devices in these group members are capable of running the WeChat app (that is, the target app). For example, the mobile phone may obtain a device parameter of each group member in the device group 200 in which the mobile phone is located, for example, a parameter indicating whether a display function is supported, or whether an audio output function is supported. Further, the mobile phone may display, based on a type of the WeChat app, a group member (for example, the tablet computer and the smart television) having the display function as a candidate device in the prompt box 403. For another example, if the mobile phone, the tablet computer, the smart television, and the smart speaker are logged in as the device group 200 using a same Huawei account, a device parameter of each group member in the device group 200 is maintained in a corresponding server. In this case, the mobile phone can also send a WeChat app switching request to the server, to request the server to determine one or more candidate devices that are in the device group 200 and that can run the WeChat app.

Alternatively, after finding, by query, one or more group members included in the device group 200 in which the mobile phone is currently located, the mobile phone may further sort these group members by using a specific algorithm, to determine rankings of devices that are in the device group 200 and that are suitable for running the WeChat app. For example, the mobile phone may sort group members other than the mobile phone in the device group 200 based on factors such as a device parameter of each group member, a software requirement of the WeChat app, and a use habit of the user. A device with a higher ranking is more suitable for running the WeChat app. In this way, the mobile phone may display each candidate device in the prompt box 403 based on a sorting result, so that the user can switch the WeChat app to a more suitable device for continuous running.

Subsequently, after the mobile phone displays the prompt box 403 indicating playing across devices for the WeChat app, the user may select, from candidate devices provided in the prompt box 403, a candidate device (for example, the smart television) as a second electronic device that subsequently runs the WeChat app. In response to the user's operation of selecting the smart television, the mobile phone may switch the multimedia data output by the WeChat app from the mobile phone to the smart television for playing across devices.

Figure 6:
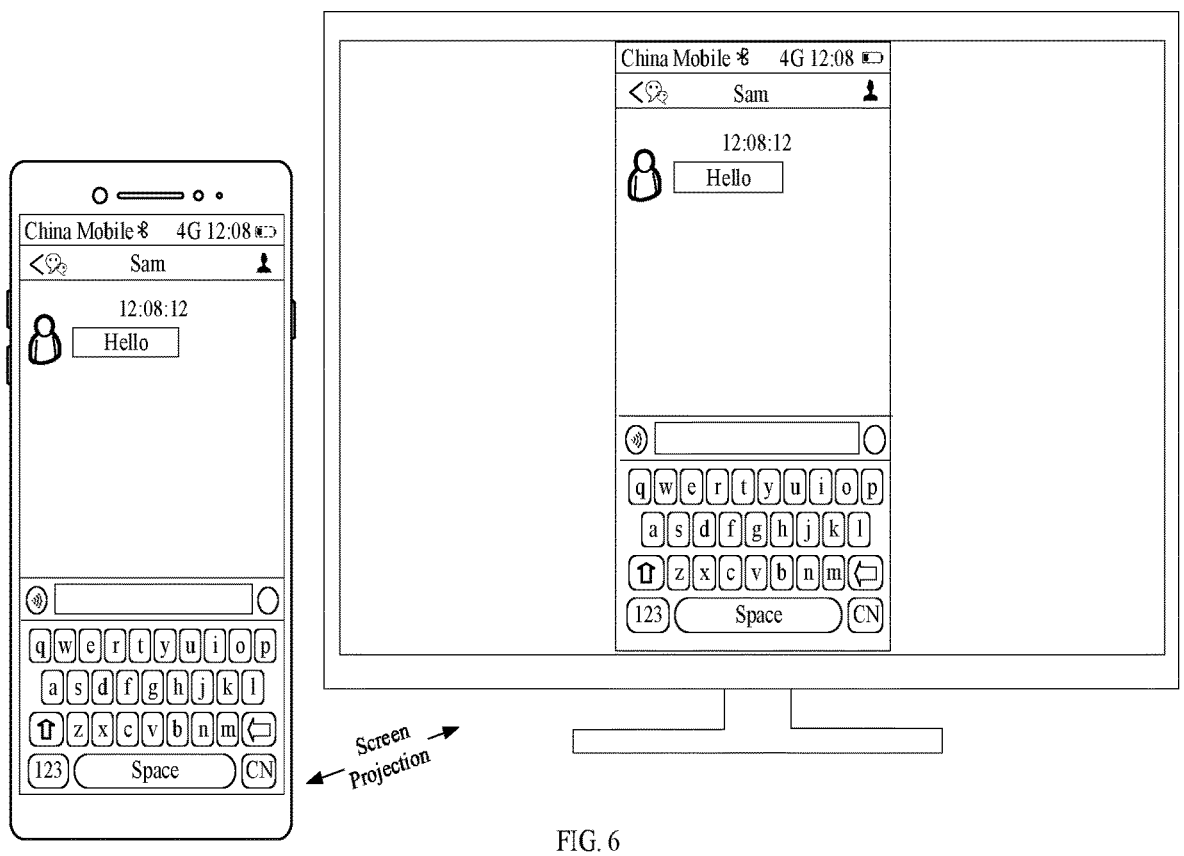
FIG. 6 is a schematic diagram 4 of an application scenario of a multimedia data playing method according to an embodiment of this application.

For example, as shown in FIG. 6, the mobile phone may send, to the smart television by using a screen projection function, displayed data that is output when the WeChat app is run, and the smart television continues to display a display interface output by the WeChat app. It should be noted that the WeChat app is being displayed in the foreground of the mobile phone, and therefore the mobile phone may send all displayed data to the smart television in a mirroring manner for display. In this case, the displayed data sent by the mobile phone not only includes an application interface of the WeChat app, but also may include data displayed in a status bar. That is, when switching the multimedia data output by the WeChat app to the smart television, the mobile phone may also switch, to the smart television for display, other information that is displayed in the status bar, a dock bar, and the like when the WeChat app is run. Certainly, the mobile phone may alternatively send only an application interface displayed when the WeChat app is running to the smart television for display. This is not limited in the embodiments of this application.

Alternatively, if the WeChat app has been installed on the smart television, the mobile phone may send an instruction of starting the WeChat app to the smart television. The smart television is enabled to respond to the instruction and start the WeChat app installed on the smart television, so that the WeChat app on the mobile phone is switched to the smart television for continuous running. Alternatively, when sending the instruction of starting the WeChat app to the smart television, the mobile phone may further add current running data of the WeChat app to the instruction. For example, the running data is used to indicate that a chat interface for a contact Sam is currently displayed in the WeChat app. In this case, after starting the WeChat app installed on the smart television, the smart television may automatically jump to the chat interface for the contact Sam according to the running data. In this way, seamless continuous playing can be implemented when multimedia data is switched between a plurality of devices.

For example, after switching the multimedia data output by the WeChat app from the mobile phone to the smart television for playing, the mobile phone may continue to run the WeChat app to output corresponding multimedia data. Alternatively, the mobile phone may stop running the WeChat app. For example, the user may perform an operation of exiting the WeChat app to return to a desktop of the mobile phone or start another app. Certainly, after the mobile phone switches the WeChat app to the smart television for playing across devices, the user may also perform various operations on the WeChat app on the smart television, for example, chatting with a contact in the WeChat app. This is not limited in the embodiments of this application.

In the foregoing embodiments, when running a target app, the first electronic device (for example, the foregoing mobile phone) may receive triggering of the device switching button 201 performed by the user, and further, the first electronic device may switch, at a per-application granularity, the target app to the second electronic device (for example, the foregoing smart television) selected by the user for playing across devices. In this way, multimedia data output by the target app in the first electronic device is switched to the second electronic device for playing across devices.

In some other embodiments, after determining a target app that can support multimedia data playing across devices, a first electronic device may further determine whether the target app includes a target task that needs to be switched. Further, the first electronic device may switch, at a per-task granularity, the target task to a second electronic device selected by a user for playing across devices.

Figure 7A:
FIG. 7(a) and FIG. 7(b) are a schematic diagram 5 of an application scenario of a multimedia data playing method according to an embodiment of this application.
Figure 7B:
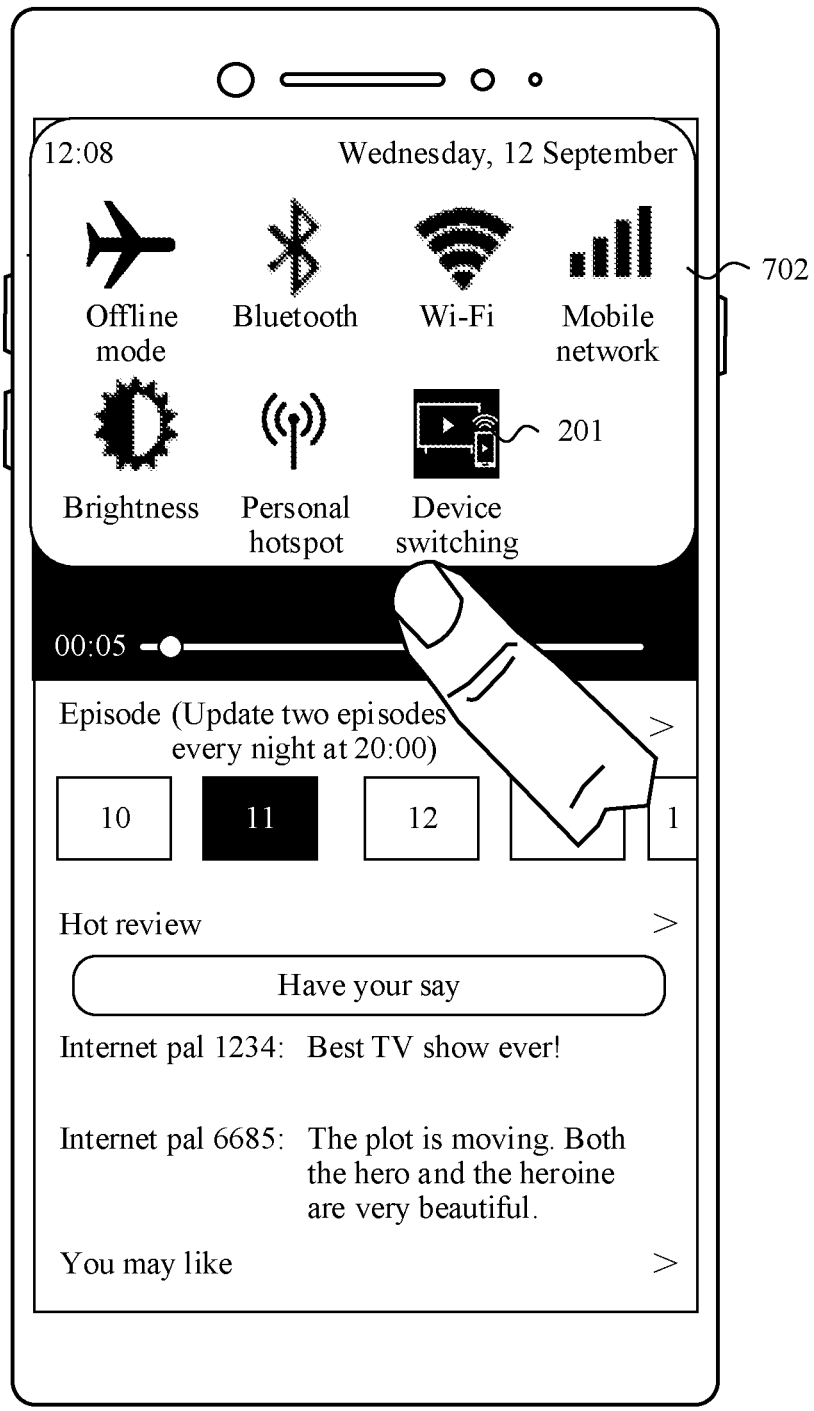

For example, the user may start a video app by using a mobile phone (that is, the first electronic device) and choose to play a specific TV series. In this case, the mobile phone may display a playing interface 701 of the TV series in the video app, as shown in FIG. 7(a). If the mobile phone detects that the user performs a pull-down operation on the playing interface 701, the mobile phone may display a drop-down menu 702 including the device switch button 201, as shown in FIG. 7(b). If the mobile phone detects that the user touches the device switching button 201 on the drop-down menu 702, the mobile phone may determine, as a target app, the video app that is running before the user touches the device switching button 201.

Figure 8A:
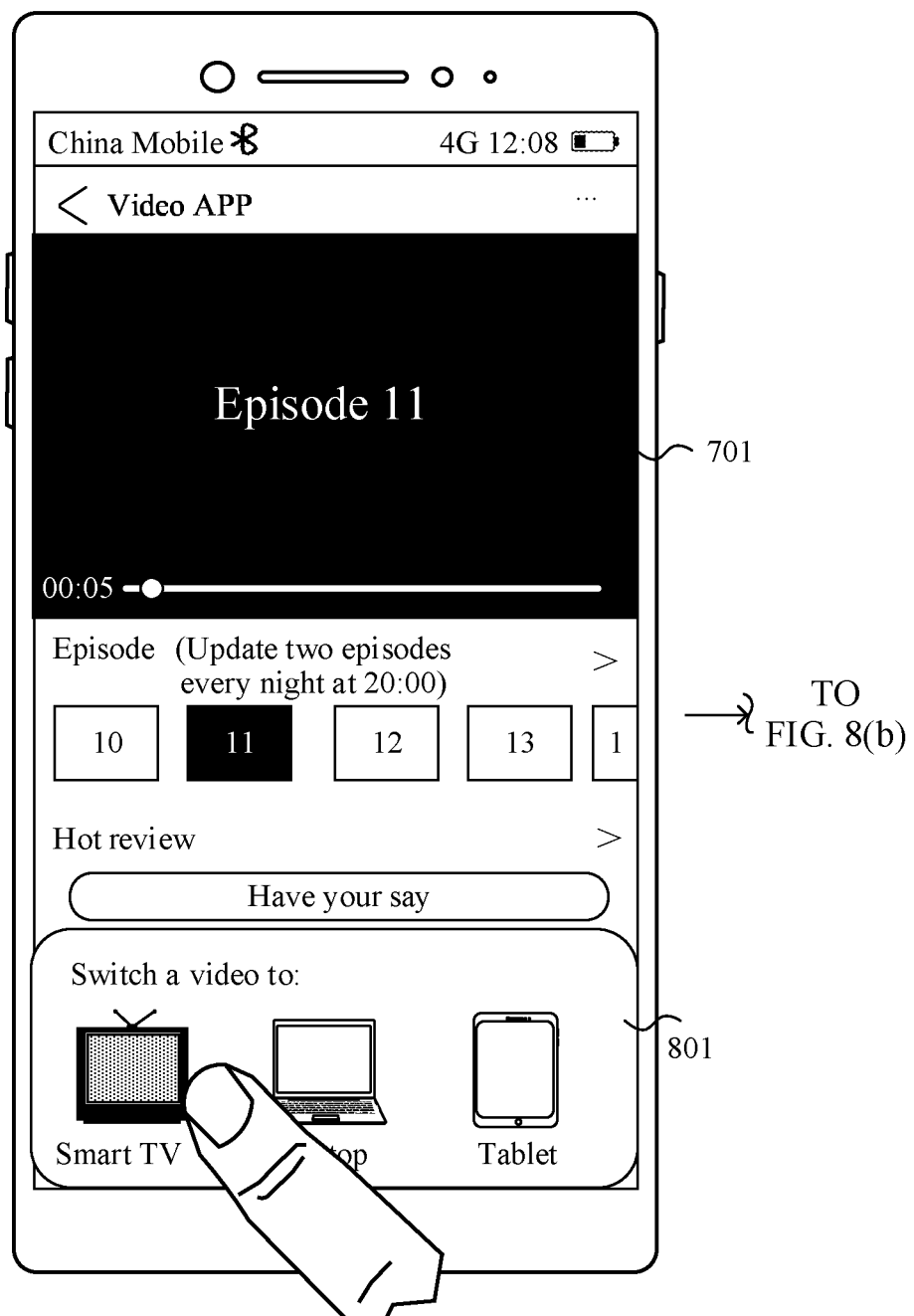
FIG. 8(a) and FIG. 8(b) are a schematic diagram 6 of an application scenario of a multimedia data playing method according to an embodiment of this application.

Further, the mobile phone may determine whether a task currently executed by the target app is a preset target task. The target task may be a video playing task, a music playing task, a video call task, an audio call task, or the like. When the mobile phone runs these target tasks, the user usually focuses on audio or video data that is being played. Therefore, if the task currently executed by the target app is the foregoing target task, for example, the task currently executed by the target app is a task of playing the foregoing TV series, and the task is a video playing task, then the mobile phone may display a prompt box 801 indicating switching of the target task for playing across devices, as shown in FIG. 8(a). Similarly, the prompt box 801 also includes one or more candidate devices. A difference lies in that after the candidate device in the prompt box 801 is selected, the playing interface of the TV series in the video app instead of an application interface of the entire video app is displayed in the selected candidate device.

Figures 8A, 8B:

Still as shown in FIG. 8(a), if it is detected that the user selects a smart television (that is, the second electronic device) from the candidate devices in the prompt box 801, it indicates that the user expects to switch the task of playing the TV series to the smart television for running. In this case, as shown in FIG. 8(b), the mobile phone may switch, in a manner such as screen projection, the task of playing the TV series to the smart television for continuous display, thus switching video data played in the video app from the mobile phone to the smart television for playing. In this case, the smart television executes only the task of playing the TV series, and other content (for example, comment content and advertisement content) that is in the video app and that is displayed by the mobile phone may not be displayed by the smart television, so that the user can obtain immersive audio-visual experience in an audio-video device switching scenario.

Figure 9A:
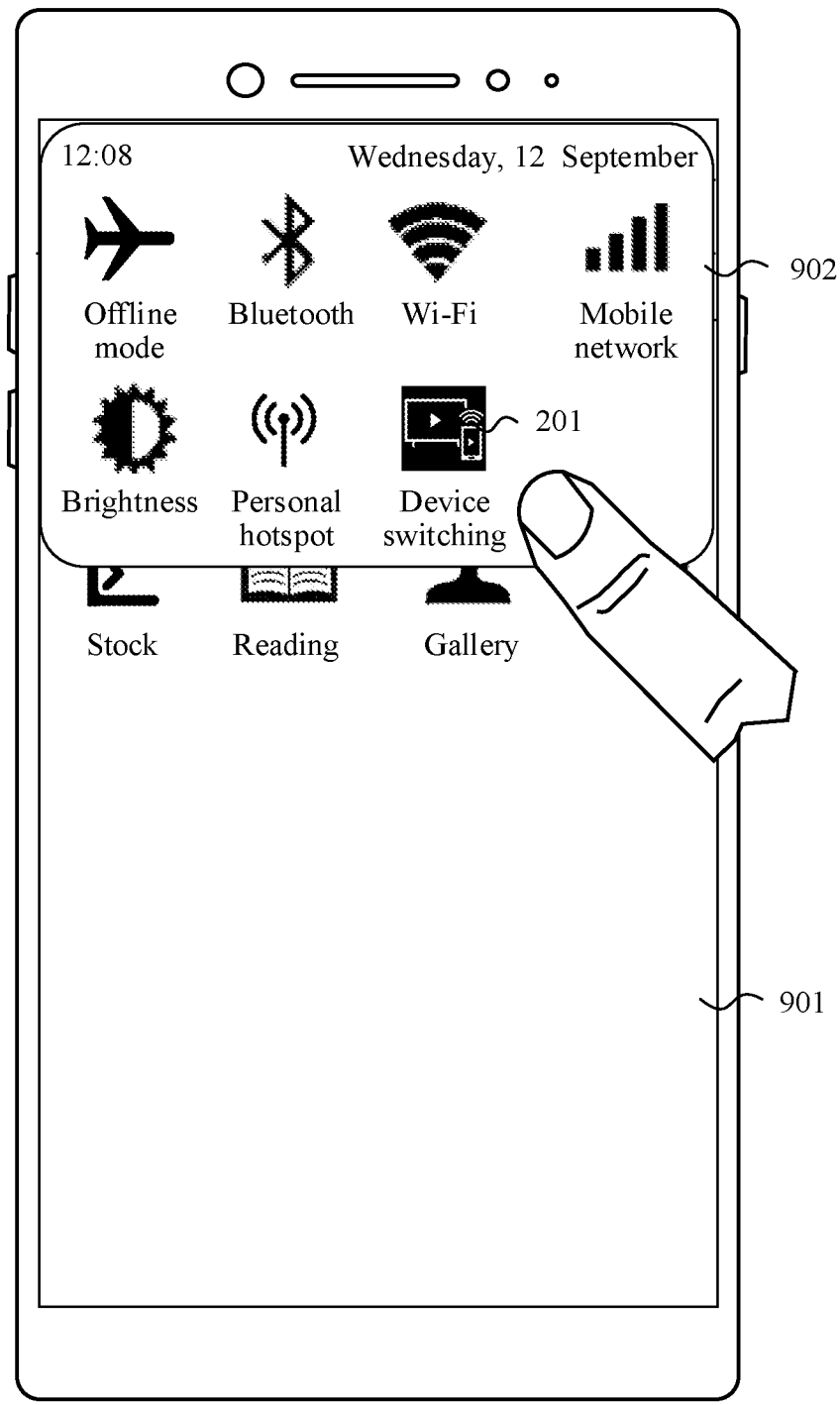
FIG. 9(a) and FIG. 9(b) are a schematic diagram 7 of an application scenario of a multimedia data playing method according to an embodiment of this application.
Figure 9B:
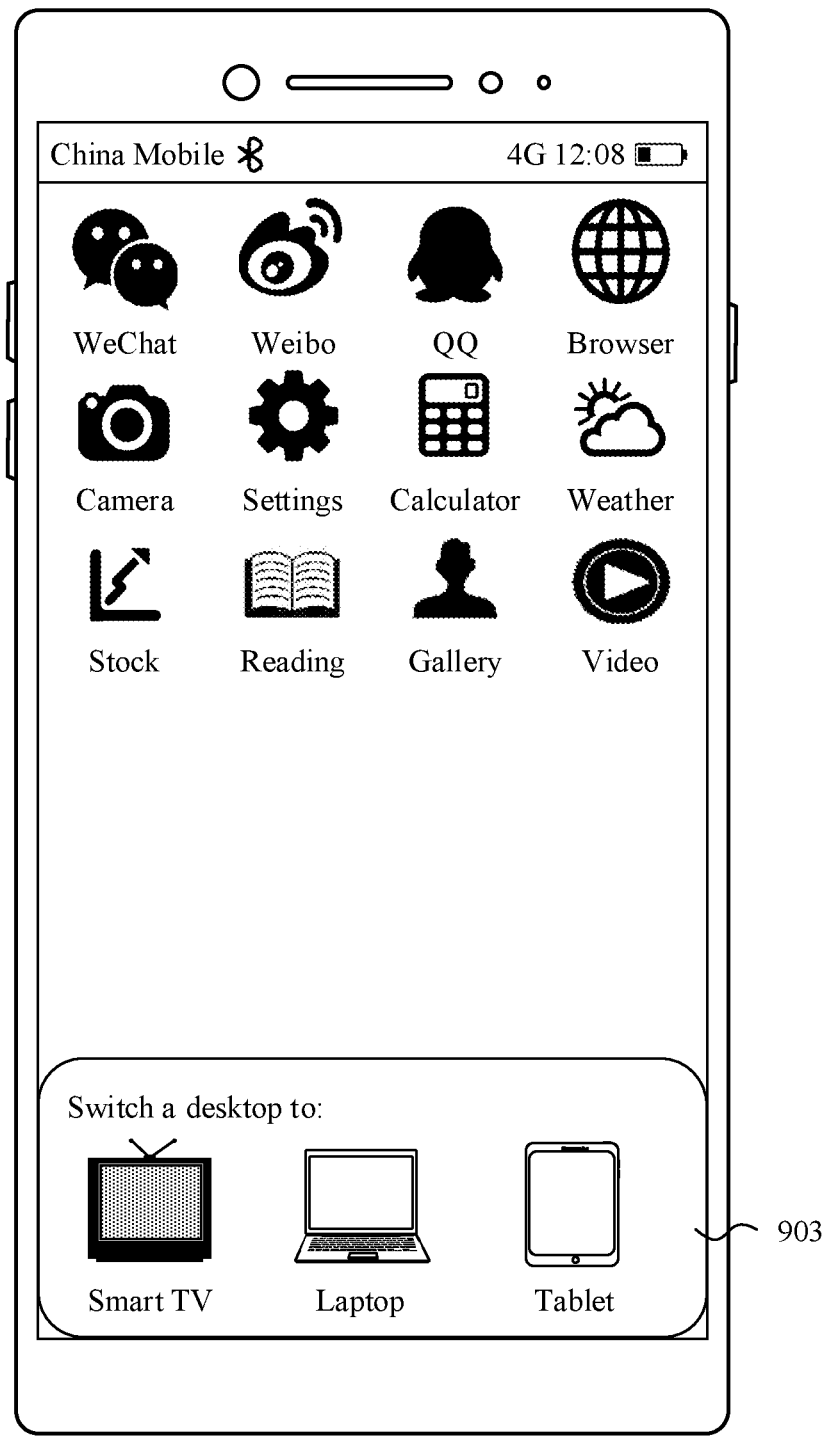

In some other embodiments, a user may also open a drop-down menu through a desktop (which may also be referred to as a home screen, home screen). As shown in FIG. 9(a), when a mobile phone displays a desktop 901, if the mobile phone detects that the user performs a pull-down operation, the mobile phone may display a drop-down menu 902 including the device switch button 201. If the mobile phone detects that the user touches the device switching button 201 on the drop-down menu 902, the mobile phone may determine that the desktop is a target app that needs to be switched to another device for playing across devices. Further, as shown in FIG. 9(b), the mobile phone may display a prompt box 903 indicating switching of the desktop for playing across devices, where the prompt box 903 also includes one or more candidate devices.

In this case, if the mobile phone detects that the user selects a specific candidate device (for example, a smart television) in the prompt box 903, the mobile phone may switch the desktop of the mobile phone to the smart television for playing across devices. For example, the mobile phone may project, in a screen projection manner, the entire desktop of the mobile phone to the smart television for display. The desktop of the mobile phone is an operating system-level application. Therefore, after the desktop of the mobile phone is projected to the smart television, each operation performed by the user on the desktop of the mobile phone may be projected to the smart television, thereby implementing a system-level screen projection operation.

In this way, according to the method provided in the embodiments of this application, an entire operating system may be switched from one electronic device to another electronic device for playing across devices, or a specific application may be switched, at a per-application granularity, from one electronic device to another electronic device for playing across devices, or a specific task of an application may be switched, at a per-task granularity, from one electronic device to another electronic device for playing across devices, thereby finally implementing cross-device playing of multimedia data between a plurality of devices.

Figure 10A:
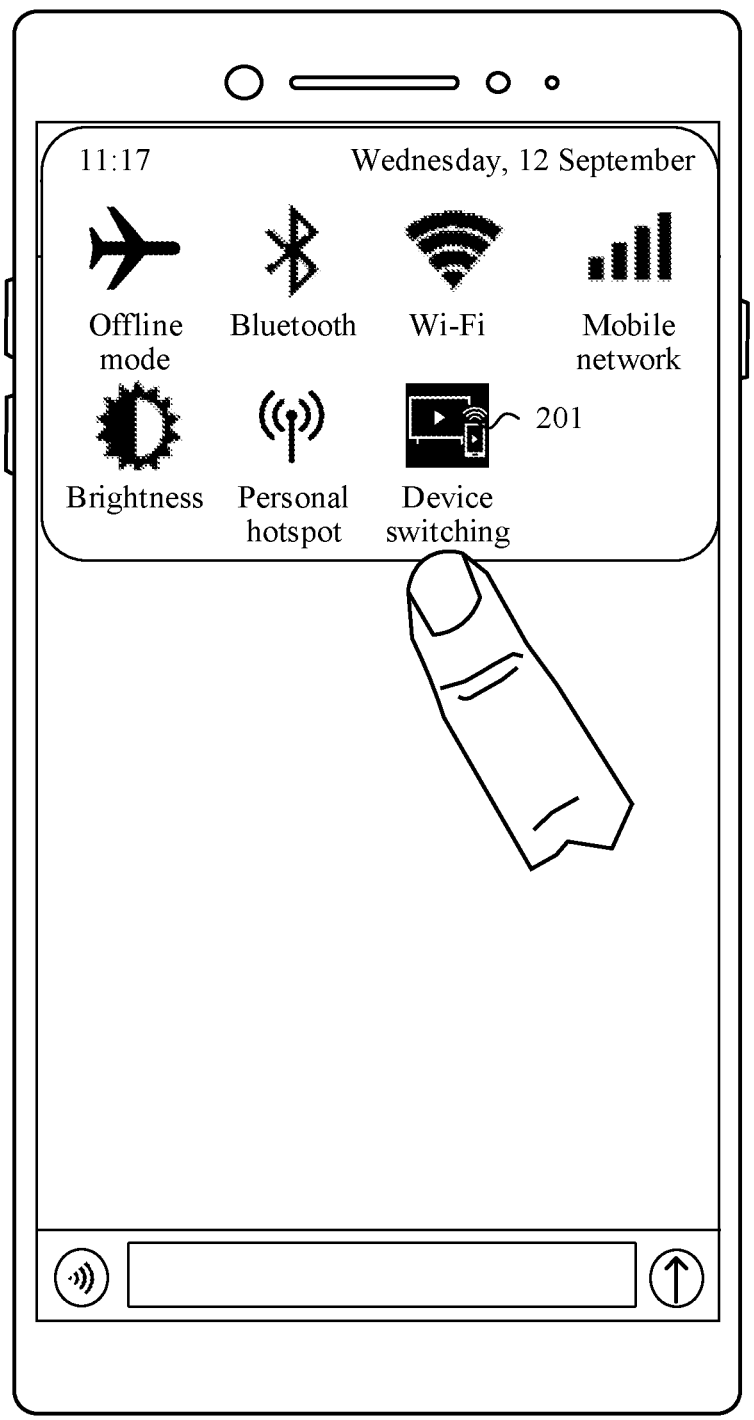
FIG. 10(a) and FIG. 10(b) are a schematic diagram 8 of an application scenario of a multimedia data playing method according to an embodiment of this application.

In some other embodiments, a mobile phone may determine a plurality of target apps that can support multimedia data playing across devices. For example, as shown in FIG. 10(a), a user invokes a drop-down menu on the mobile phone by performing a pull-down operation when the mobile phone runs a WeChat app. In this case, if the mobile phone detects that the user touches the device switching button 201 on the drop-down menu, the mobile phone may determine, as a target app, the WeChat app that is being used by the user before the device switching button 201 is touched. In addition, the mobile phone may further determine a desktop that is a system-level application as a target app.

Figure 10B:
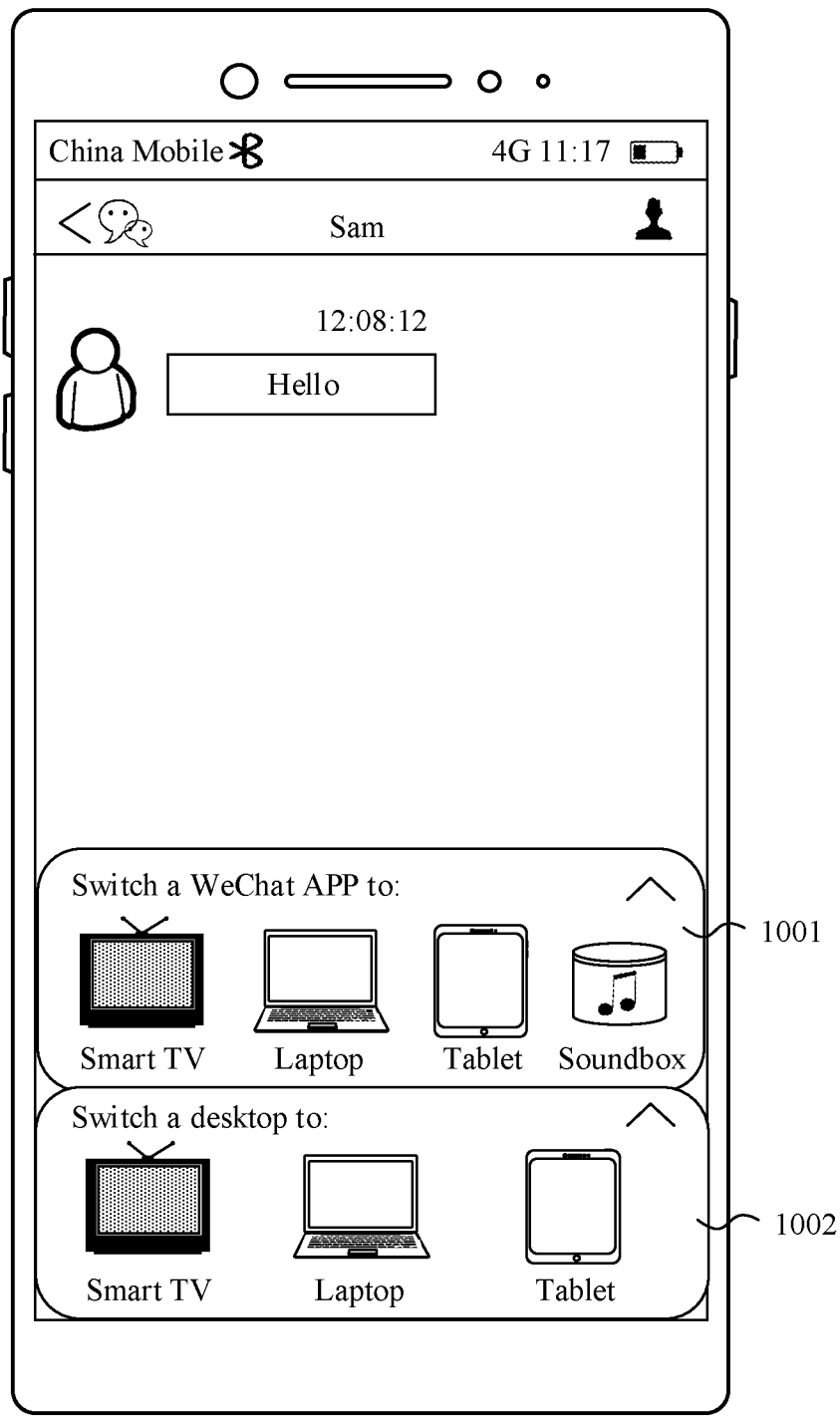

In this case, the mobile phone may display a prompt box 1001 indicating switching of the WeChat app for playing across devices and a prompt box 1002 indicating switching of the desktop for playing across devices, as shown in FIG. 10(b). If the user selects a specific candidate device in the prompt box 1001, the mobile phone may switch, at a per-application granularity, multimedia data output by the WeChat app to the candidate device selected by the user for playing across devices. If the user selects a specific candidate device in the prompt box 1002, the mobile phone may switch, at a per-operating system granularity, multimedia data output by the desktop of the mobile phone to the candidate device selected by the user for playing across devices. In this way, during implementation of multimedia data playing across devices, the user may manually select a specific target app that needs to be played across devices.

Figure 11A:
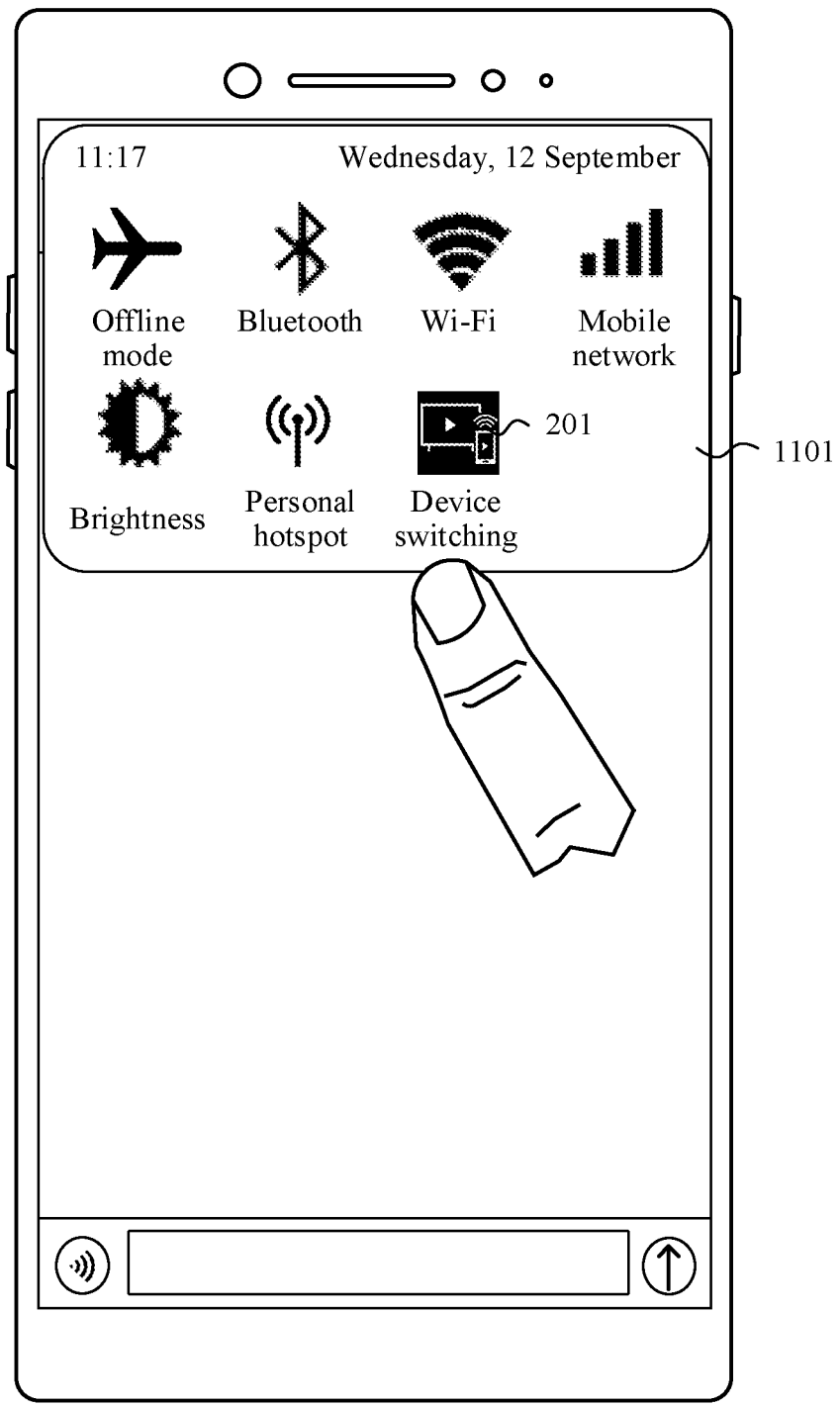
FIG. 11(a) and FIG. 11(b) are a schematic diagram 9 of an application scenario of a multimedia data playing method according to an embodiment of this application.

In some other embodiments, in addition to an app that is being used by a user before the user touches the device switching button 201, a target app determined by a mobile phone may further include an app that is run by the mobile phone in the background before the user touches the device switching button 201. For example, as shown in FIG. 11(a), the mobile phone is also running a music app and a shopping app in the background when running a WeChat app in the foreground. If the mobile phone detects that the user performs a pull-down operation on an interface of the WeChat app, the mobile phone may display a drop-down menu 1101. If the mobile phone detects that the user touches the device switching button 201 on the drop-down menu 1101, the mobile phone may determine, as target apps, all of the WeChat app, the music app, and the shopping app that are run by the mobile phone before the device switching button 201 is touched.

Figure 11B:
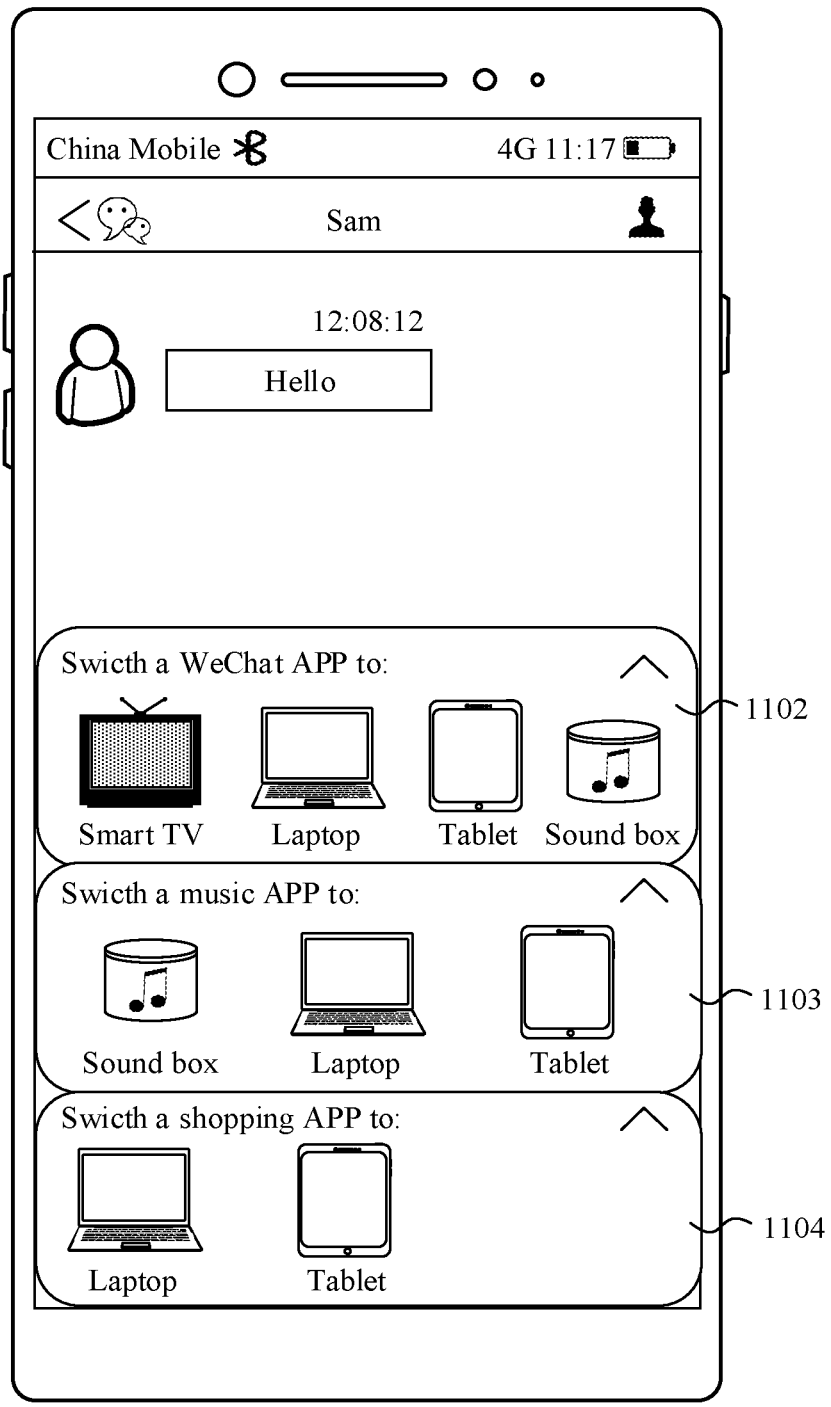

In this case, as shown in FIG. 11(b), the mobile phone may separately display prompt boxes indicating switching of the three target apps for playing across devices, that is, a prompt box 1102 indicating switching of the WeChat app for playing across devices, a prompt box 1103 indicating switching of the music app for playing across devices, and a prompt box 1104 indicating switching of the shopping app for playing across devices. If the user selects a specific candidate device in the prompt box 1102, the mobile phone may switch multimedia data output by the WeChat app to the candidate device selected by the user for playing across devices. If the user selects a specific candidate device in the prompt box 1103, the mobile phone may switch multimedia data output by the music app to the candidate device selected by the user for playing across devices. If the user selects a specific candidate device in the prompt box 1104, the mobile phone may switch multimedia data output by the shopping app to the candidate device selected by the user for playing across devices.

That is, after the mobile phone detects that the user touches the device switching button 201, each app that is running on the mobile phone may be an app whose multimedia data is expected by the user to play across devices. Therefore, the mobile phone may present, to the user, all candidate devices to which these apps can be switched, and the user selects a specific app to be switched and a specific candidate device to which the app is to be switched for running. In this way, the user can determine, through only one selection operation performed in these prompt boxes provided by the mobile phone, an app whose multimedia data is to be played across devices and a specific device to play the multimedia data of the app across devices, thereby simplifying a human-computer interaction procedure during multimedia data switching.

For example, most of multimedia data that a user expects to switch usually is audio data or video data. Therefore, when determining a target app that the user needs to switch, a mobile phone may determine an audio app and a video app as target apps. A scenario shown in FIG. 11(a) is still used as an example. The mobile phone is also running the music app and the shopping app in the background when running the WeChat app in the foreground. If the mobile phone detects that the user performs a pull-down operation on an interface of the WeChat app, the mobile phone may display the drop-down menu 1101. If the mobile phone detects that the user touches the device switching button 201 on the drop-down menu 1101, the mobile phone may determine, as a target app, the music app that is an audio app and that is in the three apps of the WeChat app, the music app, and the shopping app. Subsequently, the mobile phone may display a prompt box of the music app, and does not need to display prompt boxes of the WeChat app and the music app.

Alternatively, because the user invokes the drop-down menu 1101 when the mobile phone runs the WeChat app, there is a comparatively high probability that the user switches the WeChat app to another device for running. In this case, after detecting that the user touches the device switching button 201 on the drop-down menu 1101, the mobile phone may determine the WeChat app as one target app. For the music app and the shopping app that are run by the mobile phone in the background before the user touches the device switching button 201, the mobile phone may determine the music app that is an audio app as another target app. In this case, the mobile phone may display the prompt box of the WeChat app and the prompt box of the music app.

It should be noted that the prompt boxes (for example, the prompt box 801 shown in FIG. 8(a) and the prompt boxes 1001 and 1002 shown in FIG. 10(b)) in the foregoing embodiments may be considered as a specific display form of a prompt interface. This is not limited in the embodiments of this application.

Figure 12A:
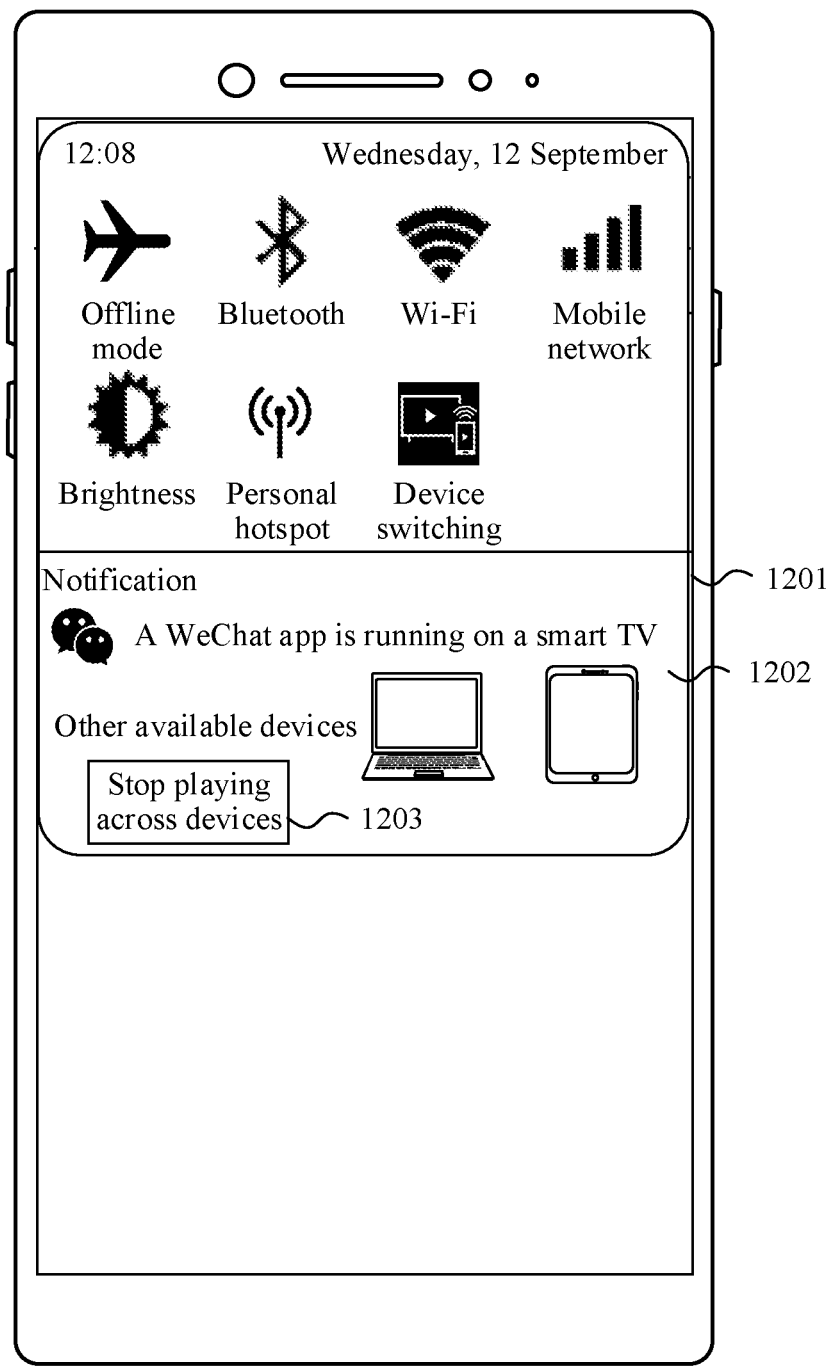
FIG. 12(a) and FIG. 12(b) are a schematic diagram 10 of an application scenario of a multimedia data playing method according to an embodiment of this application.

For example, after a first electronic device (for example, a mobile phone) switches a specific app (for example, a WeChat app) to a second electronic device (for example, a smart television) for playing multimedia data across devices, the mobile phone may display, in a message notification bar 1201, a notification message 1202 indicating that the WeChat app runs across devices, as shown in FIG. 12(a). The mobile phone may prompt, by using the notification message 1202, the user that a function of playing across devices is implemented for the WeChat app on the smart television. For example, a stop button 1203 may further be disposed in the notification message 1202 of the mobile phone. When the user wants to cancel the function of playing across devices for the WeChat app on the smart television, the user may touch the stop button 1203 in the notification message 1202. In response to the user's operation of touching the stop button 1203, the mobile phone may indicate the smart television to stop displaying an application interface of the WeChat app. For example, the mobile phone may stop sending, to the smart television, displayed data generated when the WeChat app is run, and the like. In addition, after the smart television stops running the WeChat app, the mobile phone may further switch the WeChat app back to the mobile phone for continuous display. In this way, seamless connection between the mobile phone and the smart television can be implemented for the WeChat app.

Figure 12B:
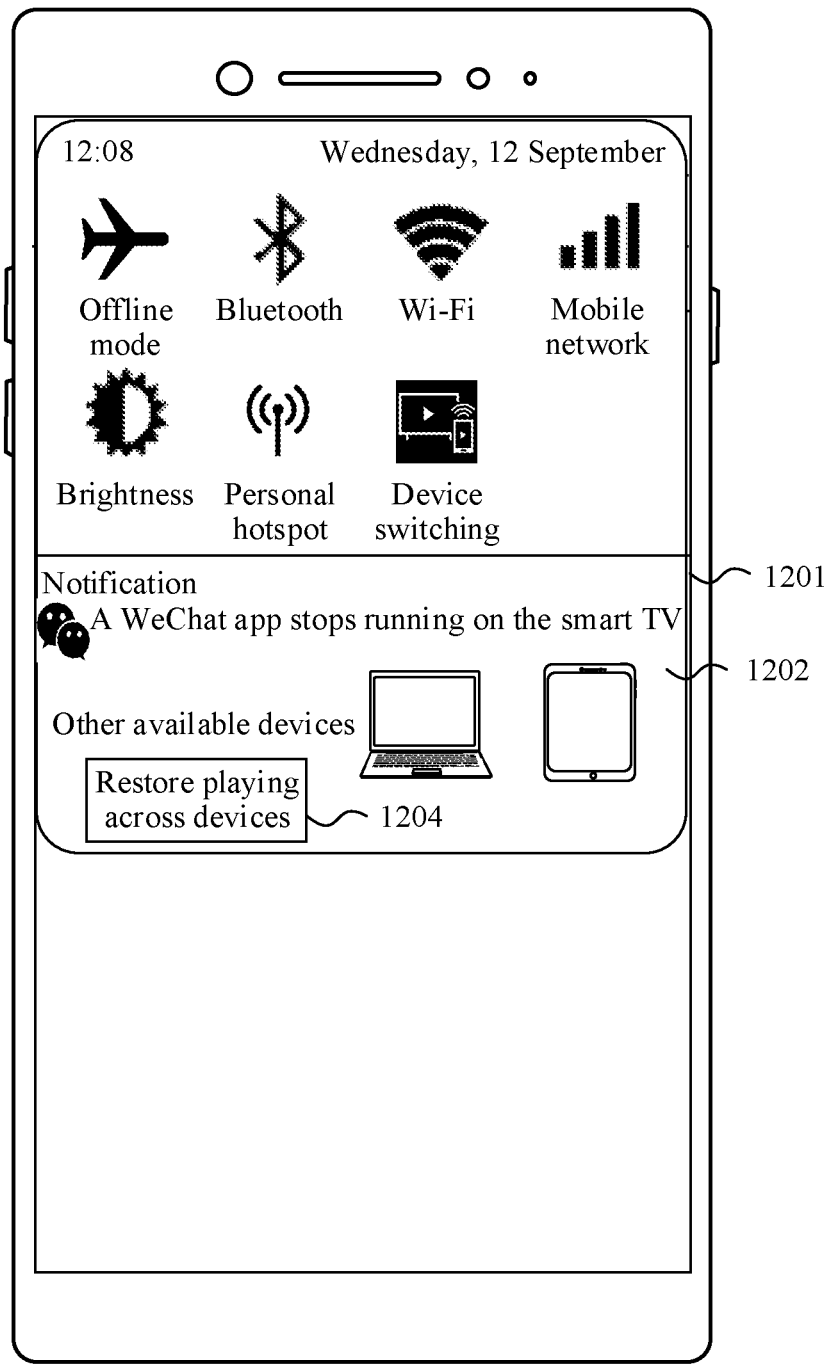

In this embodiment of this application, if the mobile phone detects that the user touches the stop button 1203 in the notification message 1202, the mobile phone may also hide the stop button 1203 and display a resume button 1204, as shown in FIG. 12(b). If the mobile phone detects that the user touches the resume button 1204, the mobile phone may switch the WeChat app to the smart television again for continuous playing across devices.

In this embodiment of this application, after detecting that the user touches the stop button 1203 in the notification message 1202, the mobile phone may also start a timer of preset duration (for example, one minute) to start counting. If the mobile phone detects, within the preset duration, that the user starts an application (or a task) of a same type as the WeChat app on the mobile phone, it indicates that the user probably also expects to switch the newly started application (or task) to the smart television for playing across devices. In this case, the mobile phone may automatically switch the application (or task) newly started by the user to the smart television for playing multimedia data of the application (or task) across devices. In other words, the mobile phone may automatically determine both an application (or a task) that needs to be played across devices and a device obtained after playing across devices is performed for the application (or task), thereby simplifying a human-computer interaction procedure during multimedia data playing across devices.

In some embodiments, the mobile phone may further prompt, in the notification message 1202, the user whether there is another electronic device that can play the WeChat app across devices. For example, if the user selects the smart television in the prompt box 403 shown in FIG. 4(c), after the mobile phone switches the WeChat app to the smart television, the mobile phone may display, in the notification message 1202, another candidate device (for example, a tablet computer or a notebook computer) other than the smart television in the prompt box 403, still as shown in FIG. 12(a). Certainly, the candidate device prompted in the notification message 1202 to the user may dynamically change. For example, when a new electronic device joins a device group in which the mobile phone is located, the mobile phone may display the new electronic device as a new candidate device in the notification message 1202.

If the mobile phone detects that the user touches a specific candidate device (for example, the tablet computer) in the notification message 1202, the mobile phone may switch the WeChat app to the tablet computer for playing across devices. In this case, multimedia data output by the WeChat app on the mobile phone may be simultaneously played on both the smart television and the tablet computer. Alternatively, when the mobile phone detects that the user touches a specific candidate device (for example, the tablet computer) in the notification message 1202, the mobile phone may indicate the smart television to stop playing the WeChat app across devices, and switch the multimedia data output by the WeChat app to the tablet computer for continuous playing. This is not limited in the embodiments of this application.

Figure 13A:
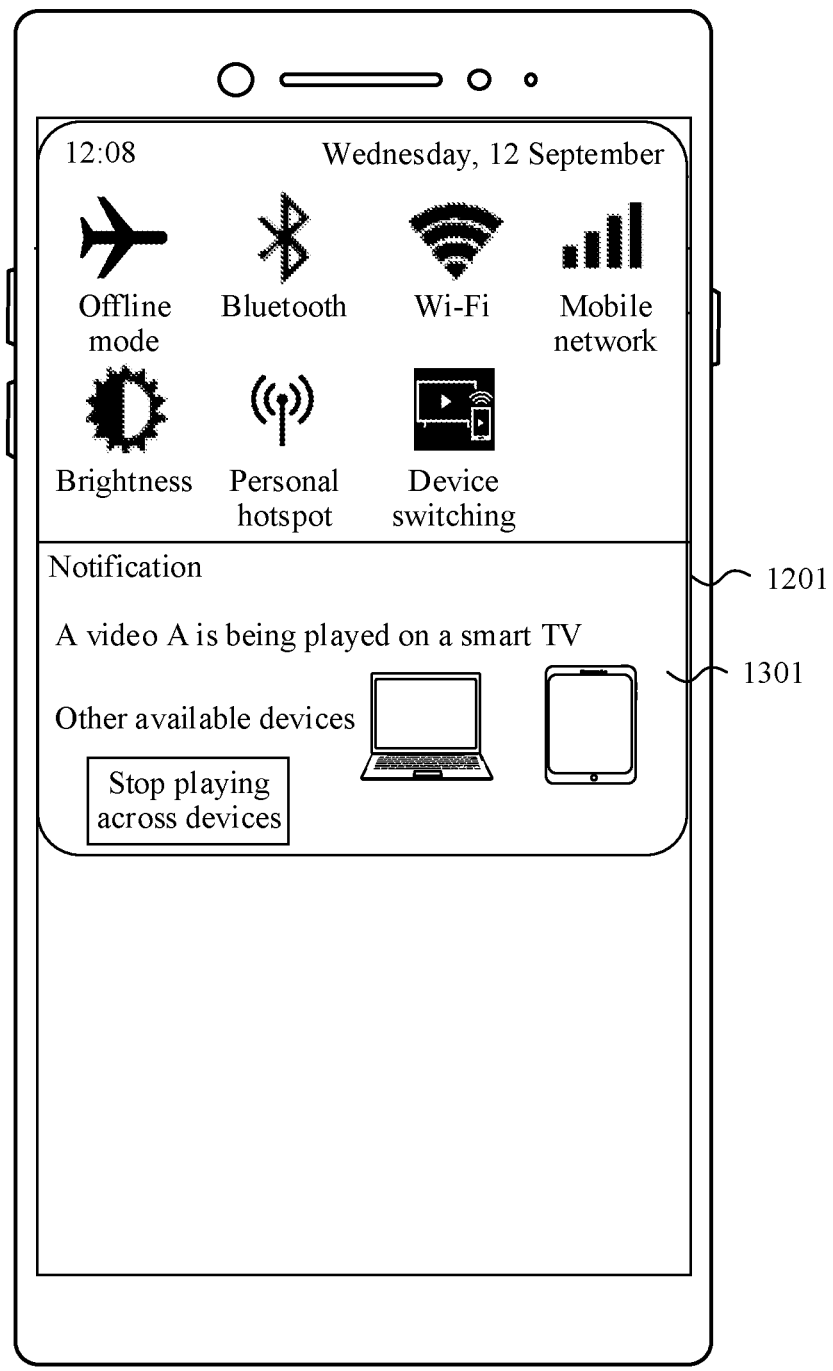
FIG. 13(a) and FIG. 13(b) are a schematic diagram 11 of an application scenario of a multimedia data playing method according to an embodiment of this application.
Figure 13B:
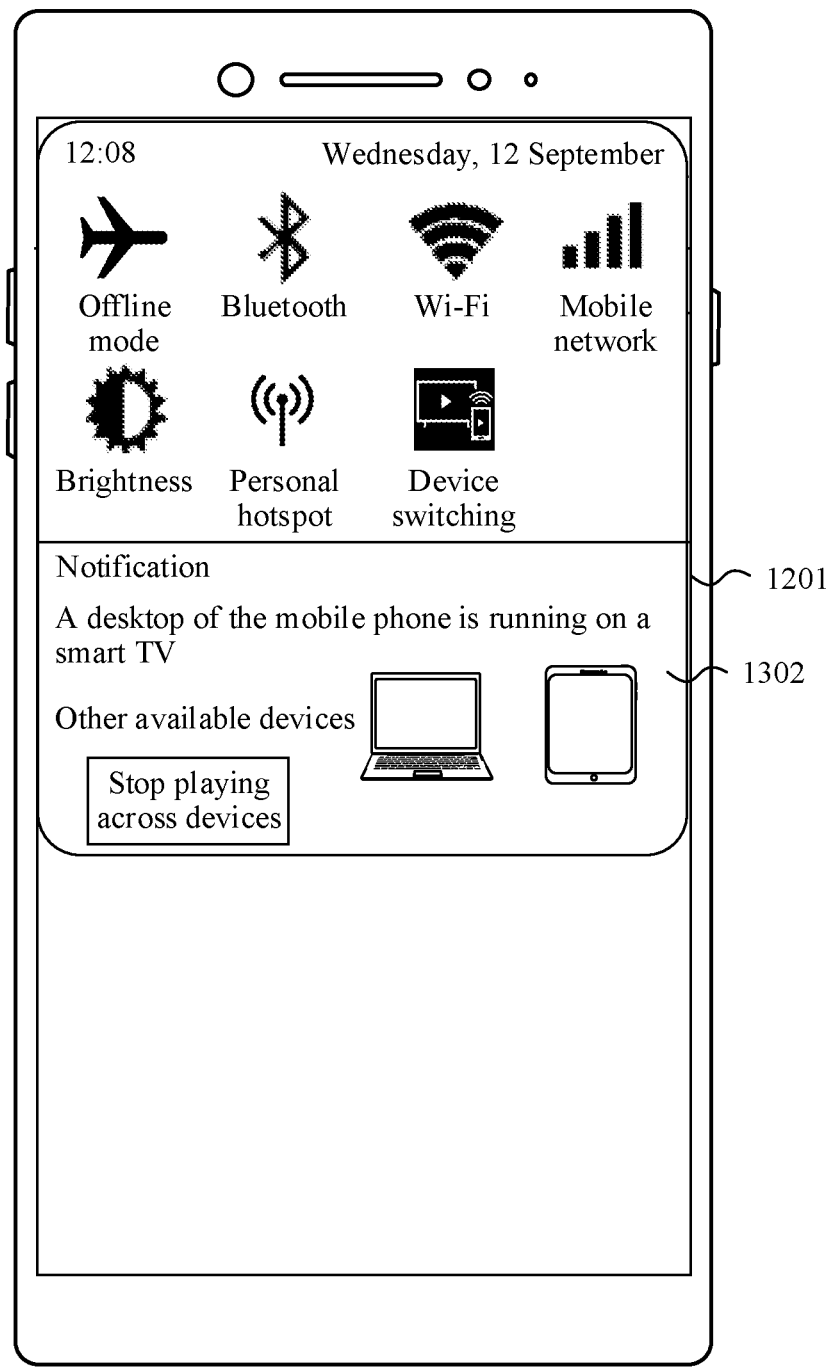

Similarly, if a first electronic device (for example, a mobile phone) switches a specific task (for example, a task of playing a TV series) of an app to a second electronic device (for example, a smart television) for running, the mobile phone may also display, in the message notification bar 1201, a notification message 1301 of playing the TV series across devices, as shown in FIG. 13(*a*). If the first electronic device (for example, the mobile phone) switches an entire desktop of the mobile phone to the second electronic device (for example, the smart television) for running, the mobile phone may also display, in the message notification bar 1201, a notification message 1302 of playing the desktop of the mobile phone across devices, as shown in FIG. 13(*b*).

In the foregoing embodiments, the user may trigger the device switching button 201 through the fixed entries (for example, a drop-down menu), so that the first electronic device determines a target app (or a target task) that can support multimedia data playing across devices, and further prompts the user of a candidate device that can play the target app (or the target task) across devices, to implement cross-device playing of multimedia data between a plurality of devices.

Figure 14:
FIG. 14 is a schematic diagram 12 of an application scenario of a multimedia data playing method according to an embodiment of this application.

In some other embodiments of this application, a first electronic device (for example, a mobile phone) may also dynamically generate a cross-device playing reminder message. The cross-device playing reminder message is used to prompt a user that an operation of playing multimedia data across devices can be performed. For example, as shown in FIG. 14, when running a video app, the mobile phone may automatically detect whether there is another electronic device that is in a device group in which the mobile phone is located and that can play the video app across devices. For example, a device group A includes a mobile phone, a notebook computer, a tablet computer, and a smart speaker. In addition to the mobile phone, both the notebook computer and the tablet computer in the device group A have a video playing function. Therefore, the mobile phone may determine the notebook computer and the tablet computer as candidate devices for playing multimedia data of the video app across devices.

Further, still as shown in FIG. 14, when running the video app, the mobile phone may display a cross-device reminder message 1401. In the cross-device reminder message 1401, the mobile phone may remind the user to switch the video app to the notebook computer or the tablet computer for playing the multimedia data of the video app. In addition, the mobile phone may further display an icon of a candidate device in the cross-device reminder message 1401, that is, an icon 1402 of the notebook computer and an icon 1403 of the tablet computer. If the mobile phone detects that the user touches the icon 1402 or the icon 1403, the mobile phone may switch multimedia data output by the video app to a corresponding candidate device for continuous playing.

For example, the mobile phone may push a cross-device reminder message to the user by using the foregoing method when running a specific application. For example, the specific application may be a video application or an audio application. The mobile phone may automatically set an installed video application and an installed audio application as the specific applications. Alternatively, the user may manually set one or more applications on the mobile phone as the specific applications.

Alternatively, the mobile phone may push a cross-device reminder message to the user by using the foregoing method when running a specific task. For example, the specific task may be a video playing task, a video download task, an audio playing task, or an audio download task. Similarly, the specific task may be manually set by the user, or may be automatically set by the mobile phone. This is not limited in the embodiments of this application.

Figure 15A:
FIG. 15(a) and FIG. 15(b) are a schematic diagram 13 of an application scenario of a multimedia data playing method according to an embodiment of this application.
Figure 15B:
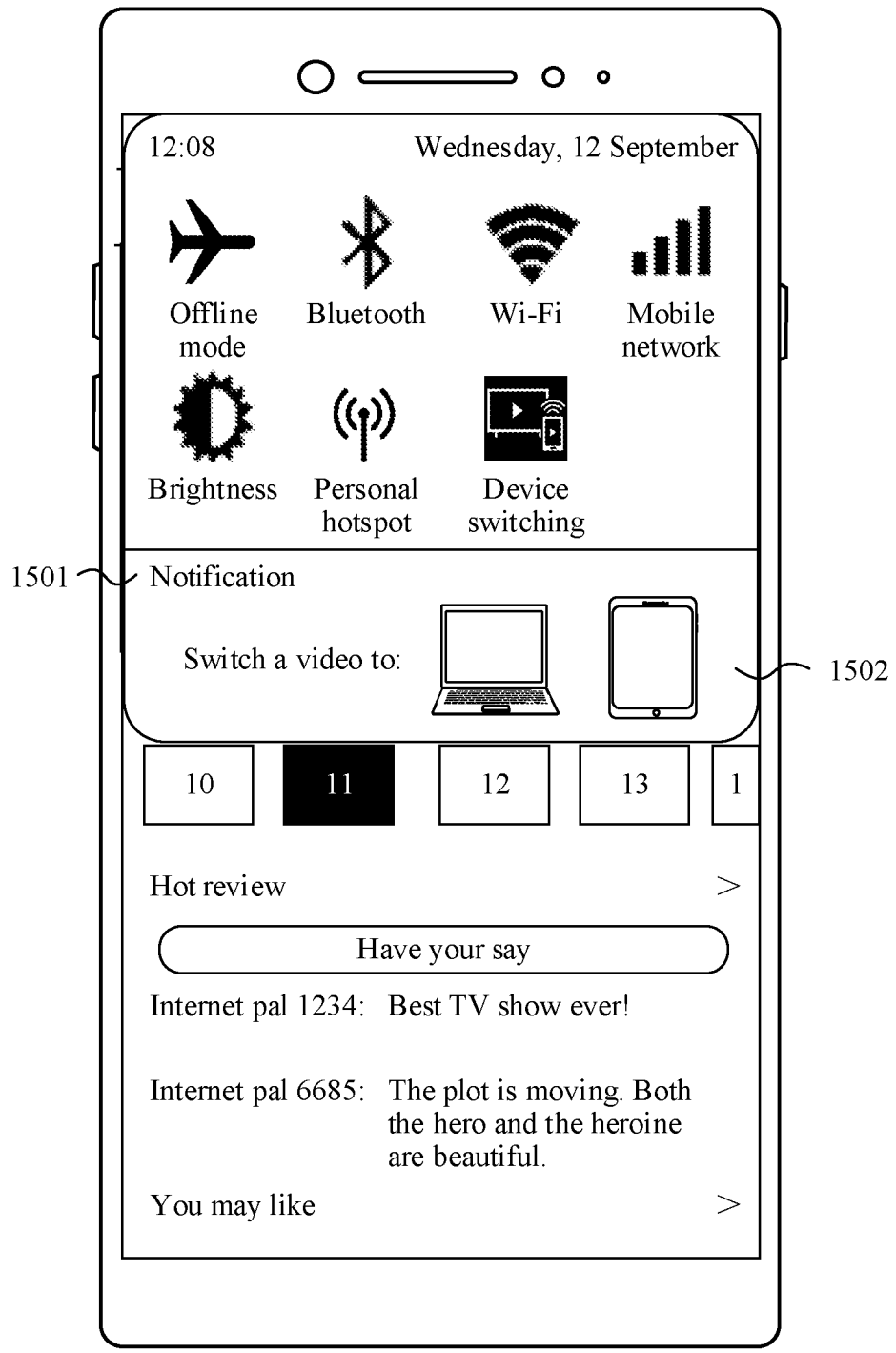

In some other embodiments, as shown in FIG. 15(*a*), when a mobile phone runs a video app, if the mobile phone detects that there is another candidate device that is in a device group in which the mobile phone is located and that can run the video app, the mobile phone may also generate a cross-device playing card in a message notification bar. In this case, if the mobile phone detects that a user performs an operation (for example, a pull-down operation) of opening a message notification bar, the mobile phone may display a cross-device playing card 1502 of the video app in a message notification bar 1501, as shown in FIG. 15(*b*). Similar to the cross-device reminder message 1401, the mobile phone may remind, in the cross-device playing card 1502, the user to switch the video app to a candidate device such as a smart television or a tablet computer for playing across devices. In addition, the mobile phone may further display an icon of the candidate device in the cross-device playing card 1502. If the mobile phone detects that the user touches an icon of a specific candidate device in the cross-device playing card 1502, the mobile phone may switch multimedia data output by the video app to the corresponding candidate device for continuous playing.

Figure 16A:
FIG. 16(a) and FIG. 16(b) are a schematic diagram 14 of an application scenario of a multimedia data playing method according to an embodiment of this application.
Figure 16B:
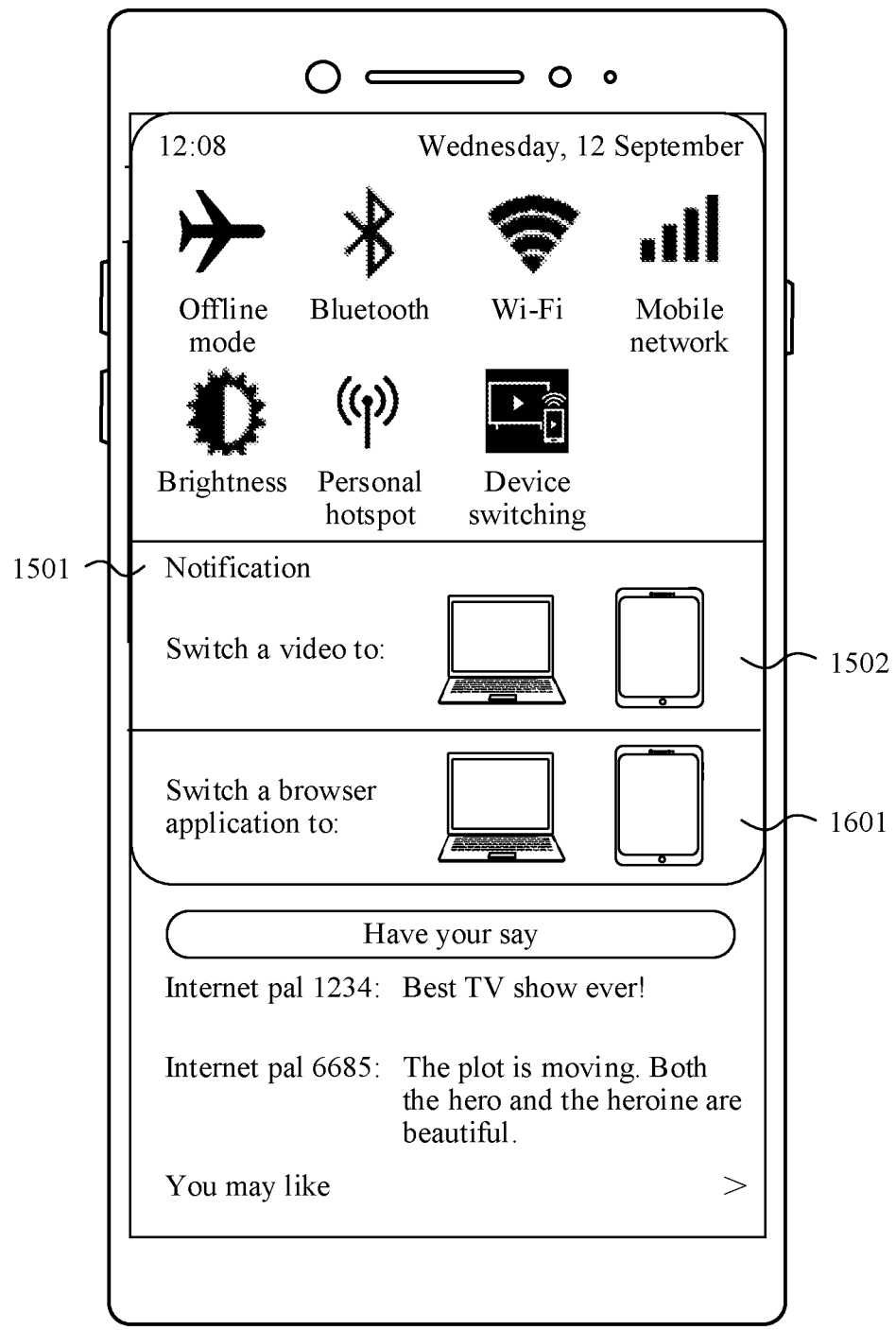
Figures 17A, 17B:
FIG. 17A to FIG. 17D are a schematic diagram 15 of an application scenario of a multimedia data playing method according to an embodiment of this application.
Figure 17C:
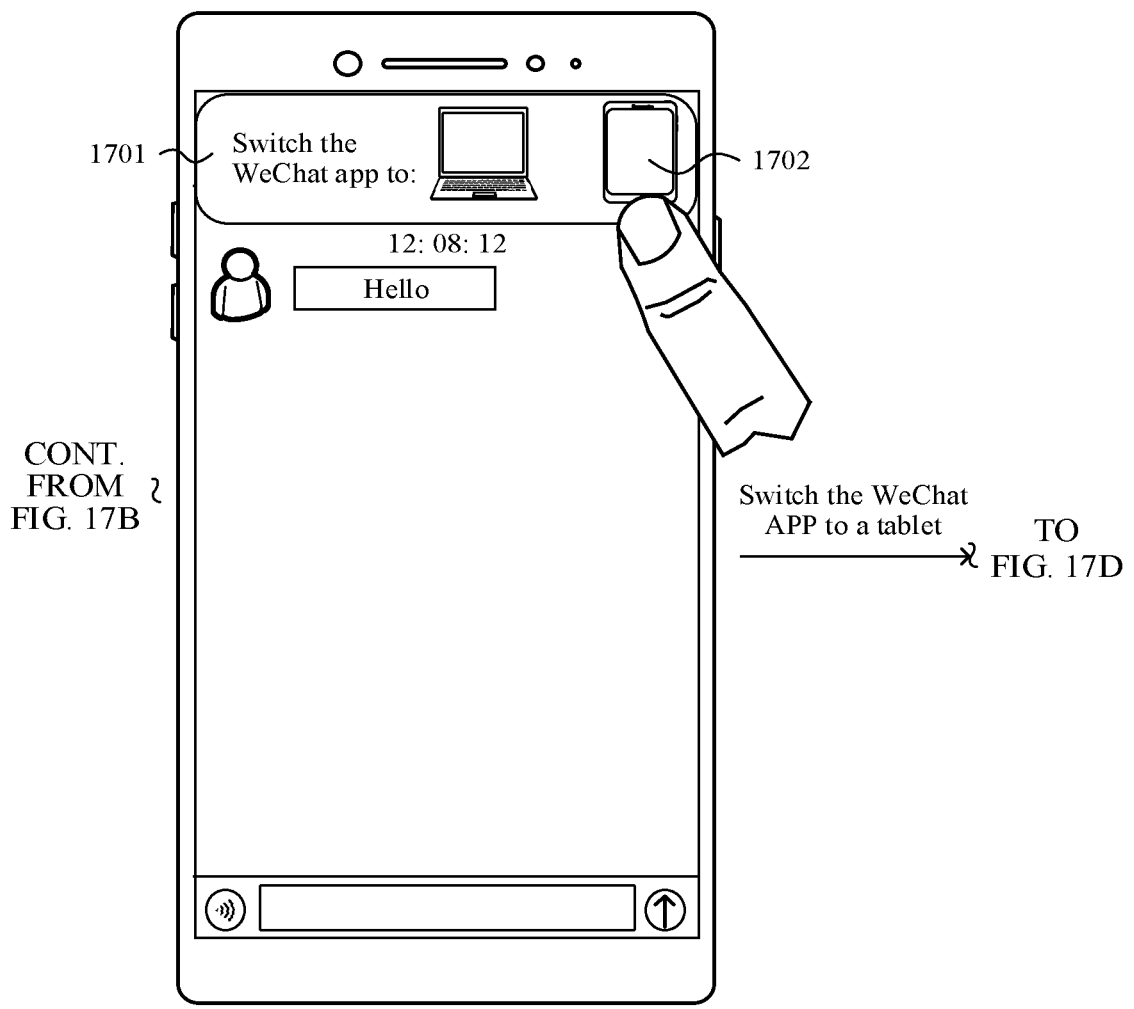
Figure 17D:
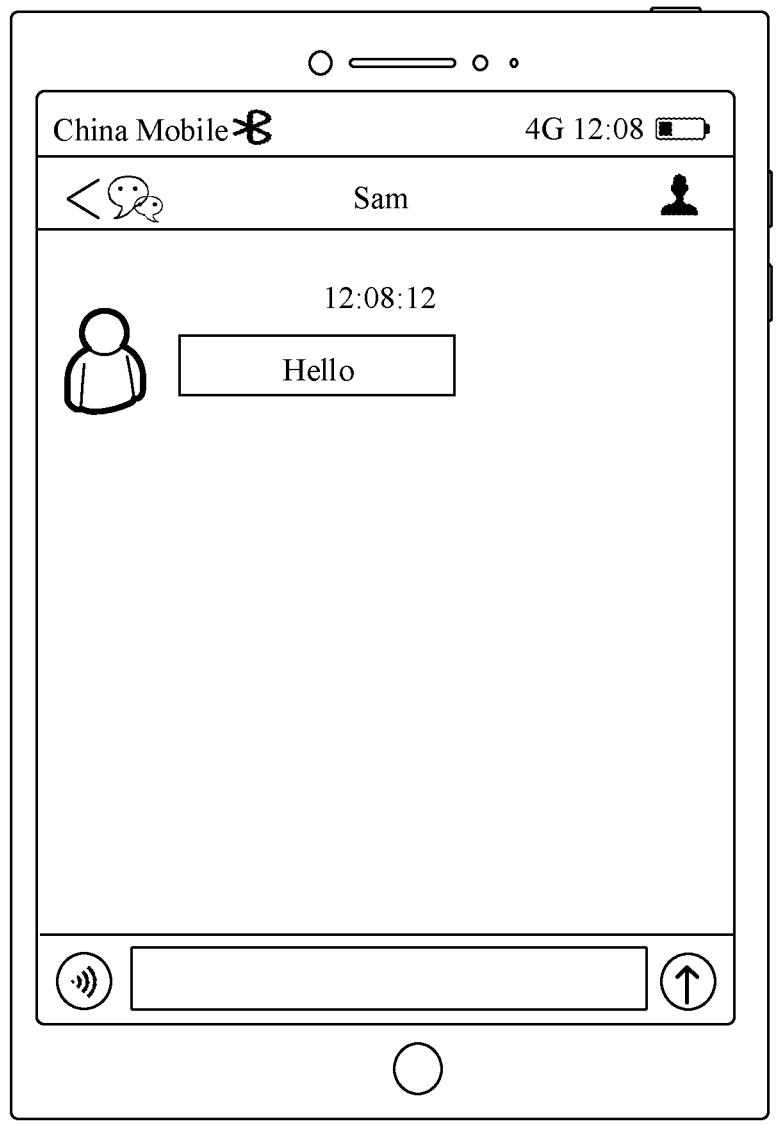

In some other embodiments, the mobile phone may also display, in the message notification bar 1501, a cross-device playing card of another application that is run by the mobile phone in the background. As shown in FIG. 16(*a*), when running the video app in the foreground, the mobile phone is also running a browser app in the background. In this case, in addition to detecting whether there is a candidate device that is in the device group and that can play the video app across devices, the mobile phone may further detect whether there is a candidate device that is in the device group and that can play the browser app across devices. Further, if the mobile phone detects that the user performs an operation (for example, a pull-down operation) of opening a message notification bar, the mobile phone may display, in the message notification bar 1501, the cross-device playing card 1502 of the video app and a cross-device playing card 1601 of the browser app, as shown in FIG. 16(*b*). In this case, the user may determine at a time, by using one or more cross-device playing cards pushed by the mobile phone, an app whose multimedia data is to be played across devices and a specific device to play the multimedia data of the app across devices, thereby simplifying a human-computer interaction procedure during multimedia data playing across devices.

Certainly, the mobile phone may also display a cross-device playing card of a desktop of the mobile phone in the message notification bar 1501. If the mobile phone detects that the user touches a specific candidate device in the cross-device playing card of the desktop of the mobile phone, the mobile phone may switch, at a per-operating system granularity, the desktop of the mobile phone to the candidate device selected by the user. This is not limited in the embodiments of this application.

It should be noted that the cross-device reminder message (for example, the cross-device reminder message 1401 in FIG. 14) or the cross-device playing card (for example, the cross-device playing card 1502 shown in FIG. 15(*b*)) in the foregoing embodiments may also be considered as a specific display form of a prompt interface. This is not limited in the embodiments of this application.

In some other embodiments of this application, after a mobile phone switches a specific app (or task) to another device for playing across devices, a user may further start another app (or task) on the mobile phone. For example, as shown in FIG. 17A to FIG. 17D, after the mobile phone switches a video app to a smart television for playing across devices, the user may further start another application on the mobile phone. An example is used in which the user starts a WeChat app. After starting the WeChat app, the mobile phone may automatically detect whether there is a candidate device that is in a device group in which the mobile phone is located and that can play the WeChat app across devices. If the mobile phone detects that there are candidate devices that are in the device group and that can play the WeChat app across devices, the mobile phone may prompt, by using the cross-device playing card or cross-device reminder message, the user to select a specific candidate device to play multimedia data of the WeChat app across devices. Still as shown in FIG. 17A to FIG. 17D, the mobile phone may display a cross-device reminder message 1701 on an interface of the WeChat app, and the cross-device reminder message 1701 includes two candidate devices for the WeChat app: a tablet computer and a smart television. If the mobile phone detects that the user touches an icon 1702 of the tablet computer, the mobile phone may switch multimedia data output by the currently running WeChat app to the tablet computer for continuous playing. In this case, multimedia data output by the video app on the mobile phone is switched to the smart television for playing, and the multimedia data output by the WeChat app on the mobile phone is switched to the tablet computer for playing. The user may enjoy, at a same moment, multimedia data separately played by different electronic devices, thereby improving user experience.

For example, the candidate devices detected by the mobile phone for the WeChat app may also include the smart television that is executing the video app. In this case, if the user also chooses to switch the WeChat app to the smart television for playing across devices, the mobile phone may indicate the smart television to stop playing the multimedia data of the video app, and start to play the multimedia data of the WeChat app. Alternatively, a priority sequence of different apps may be preset on the mobile phone, and further, the mobile phone may indicate the smart television to play the multimedia data of the video app or of the WeChat app, whichever has a higher priority. Alternatively, if multimedia data output by two apps for which the user selects a same candidate device does not conflict with each other, for example, only an audio output function is required when a music app is run, and only an image output function is required when the WeChat app is run, then the mobile phone may switch both the music app and the WeChat app to a same candidate device (for example, the foregoing smart television) for separately playing the multimedia data output by the two apps.

Figure 18:
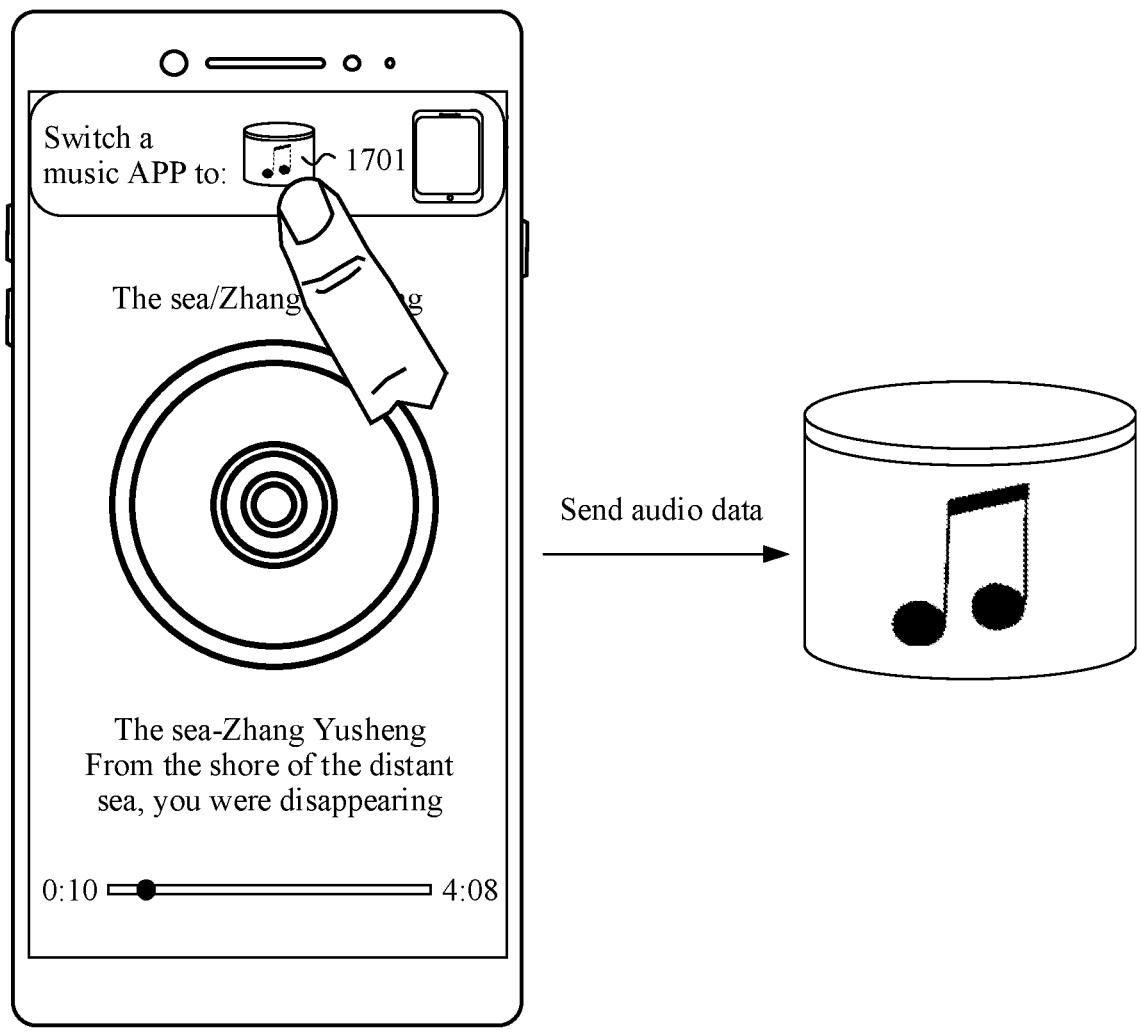
FIG. 18 is a schematic diagram 16 of an application scenario of a multimedia data playing method according to an embodiment of this application.

In some other embodiments of this application, a candidate device selected by a user for a target app may not have a display function, or may not have an audio output function. For example, as shown in FIG. 18, if the user chooses, on a mobile phone, to switch a music app to a smart speaker 1801 that does not have the display function for playing across devices, the mobile phone may send audio data generated during running of the music app to the smart speaker 1801 for playing, and does not need to send displayed data generated during running of the music app. For another example, if the user chooses, on the mobile phone, to switch a running document to the smart speaker for running, the mobile phone may convert text data in the document into audio data, and further send the audio data obtained through conversion to the smart speaker for playing. That is, if a candidate device selected by the user can execute only some functions (for example, the display function or the audio output function) of a target app, based on a device capability of the candidate device, the mobile phone may play multimedia data of the target app in a manner supported by the candidate device.

Figure 19:
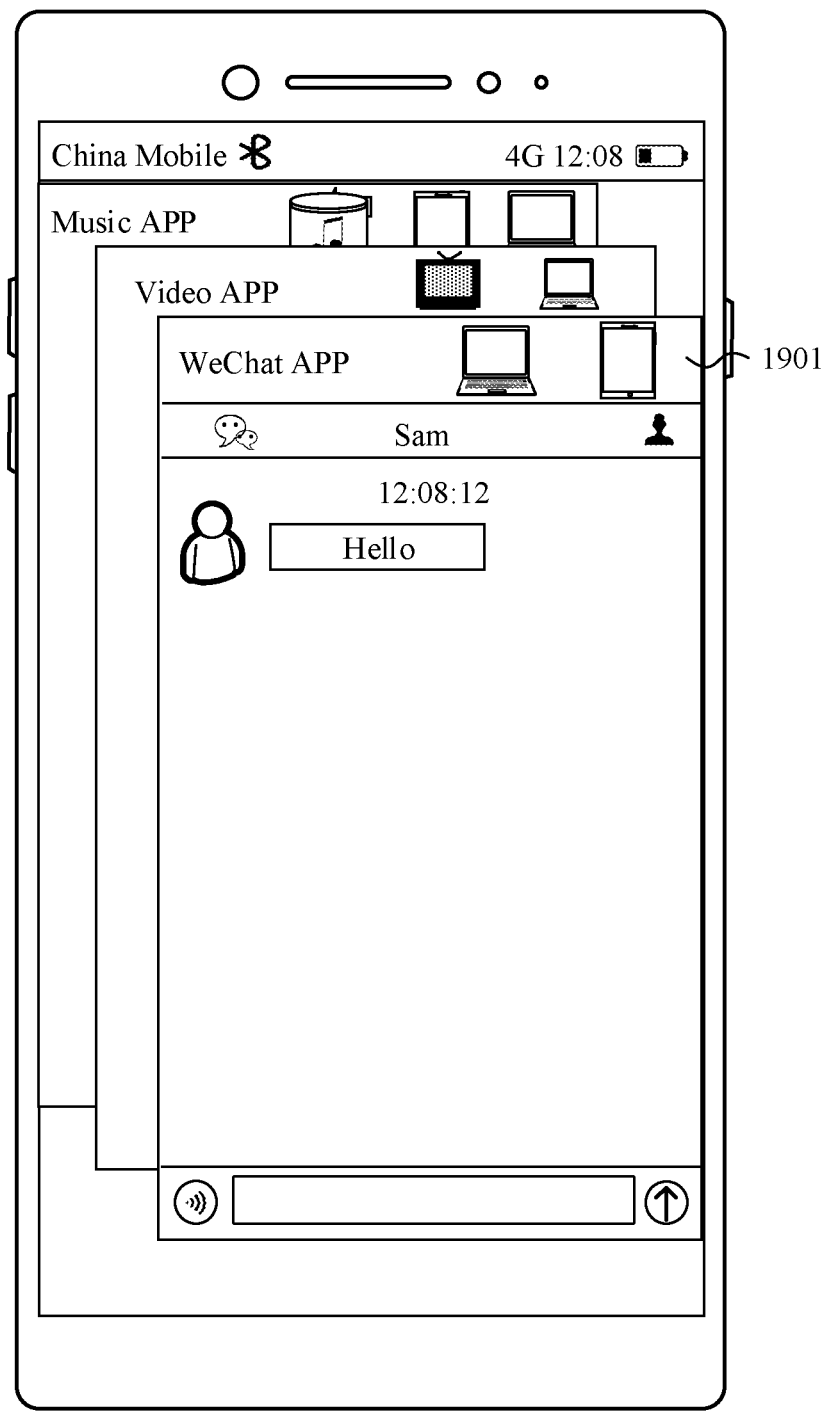
FIG. 19 is a schematic diagram 17 of an application scenario of a multimedia data playing method according to an embodiment of this application.
Figure 20A:
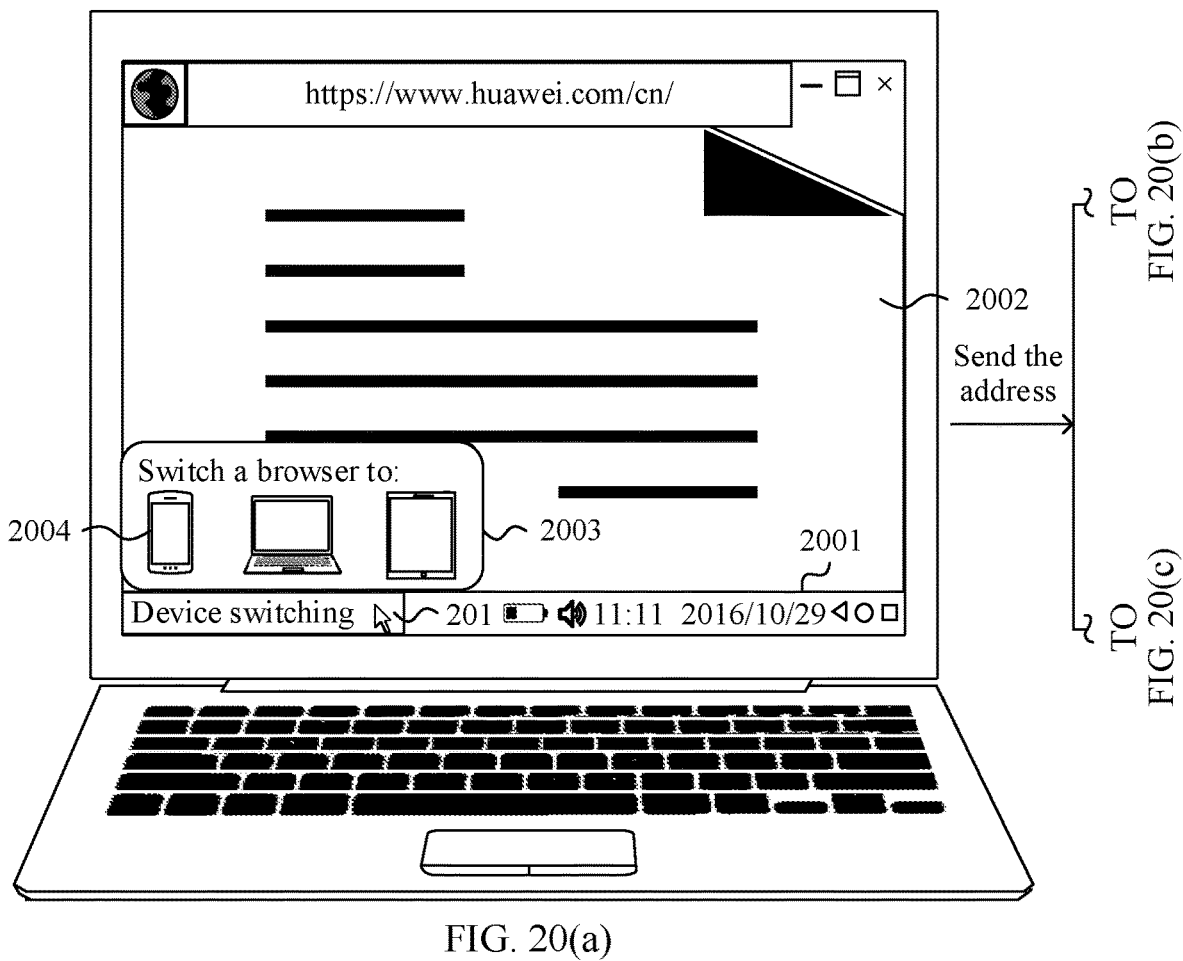
FIG. 20(a) to FIG. 20(d) are a schematic diagram 18 of an application scenario of a multimedia data playing method according to an embodiment of this application.
Figure 20B:
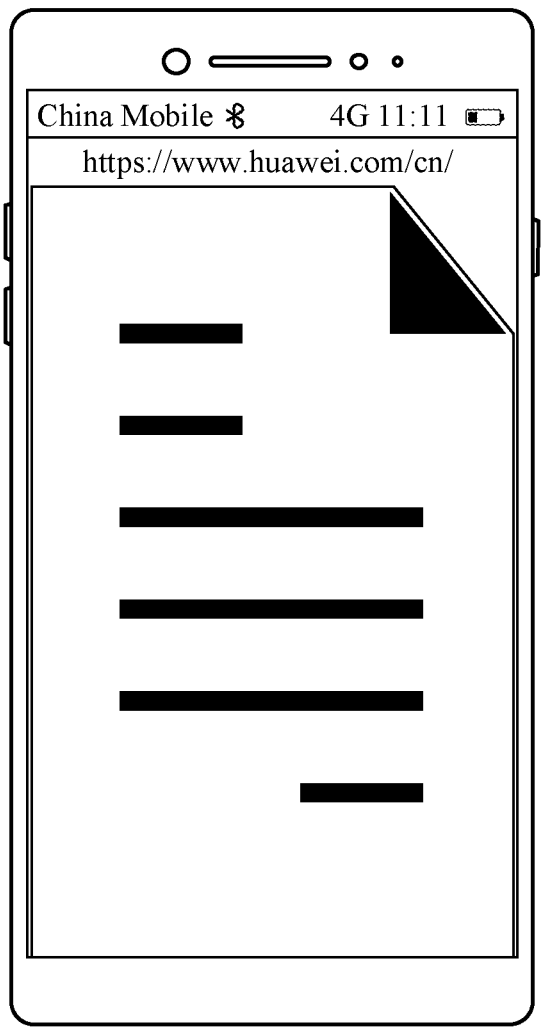
Figure 20C:
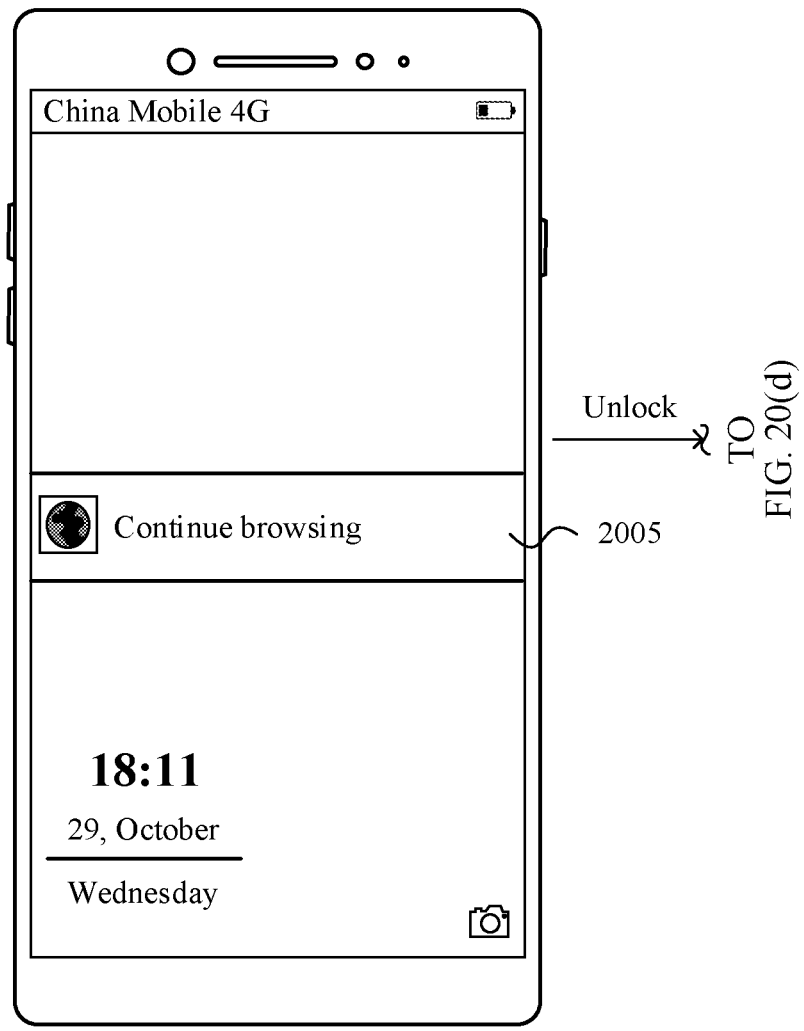
Figure 20D:
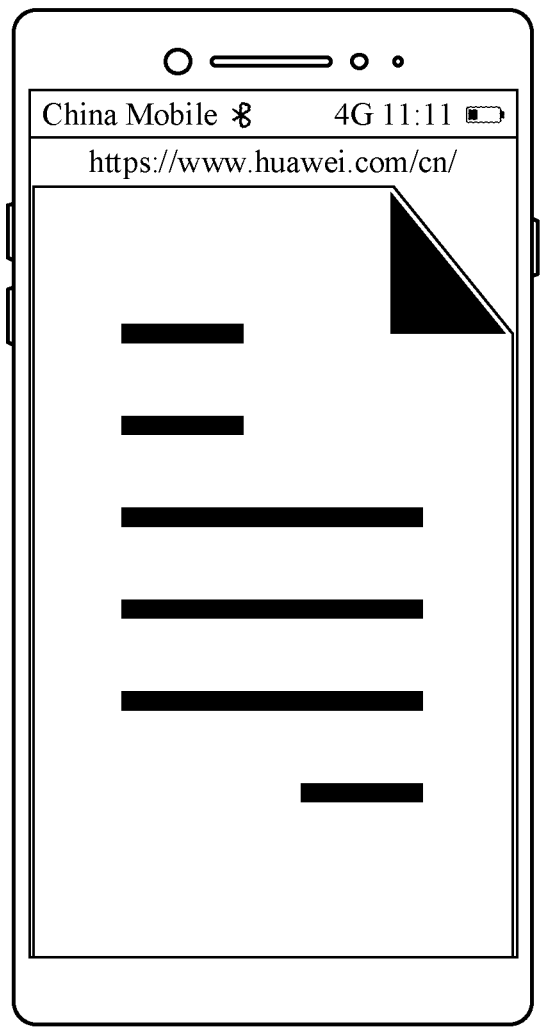

In some other embodiments of this application, a user may also select, in a multitask window of a mobile phone, a target app that needs to be played across devices and an electronic device obtained after playing across devices is performed for the target app. For example, as shown in FIG. 19, the multi-task window usually includes an application snapshot of one or more applications recently used by the user. The mobile phone may determine, for each application in the multitask window, a candidate device to play the application across devices, and further, the mobile phone may display a shortcut device switching bar in an application snapshot of each application. A WeChat app is used as an example. Still as shown in FIG. 19, the mobile phone may display a shortcut device switching bar 1901 in an application snapshot of the WeChat app, where the shortcut device switching bar 1901 includes a candidate device determined by the mobile phone for the WeChat app. In this case, if the mobile phone detects that the user selects a specific candidate device in the shortcut device switching bar 1901, the mobile phone may switch multimedia data output by the WeChat app, to a corresponding electronic device for playing.

It can be learned that, in the embodiments of this application, a plurality of shortcuts are provided to trigger the first electronic device (for example, the mobile phone) to switch multimedia data to the second electronic device for playing. For example, a device switching button may be disposed in a fixed entry (for example, a drop-down menu) of the mobile phone. By touching the device switching button, the user may trigger the mobile phone to determine a target app that needs to be played across devices and a candidate device obtained after playing across devices is performed for the target app. For another example, the mobile phone may dynamically generate a cross-device playing reminder message or a cross-device playing card of a target app, to prompt, in the cross-device playing reminder message or the cross-device playing card, the user to select a candidate device to play the target app across devices. For another example, a shortcut device switching bar may be disposed for each application in the multitask window of the mobile phone to prompt, in the shortcut device switching bar, the user to select a candidate device to play the target app across devices.

In this way, in a process of using an app, the user may select, by using any of the foregoing shortcuts, a target app and an electronic device to play the target app across devices, to complete cross-device playing of multimedia data of the target app between devices. This makes an entire human-computer interaction process more natural and friendly, and improves user experience.

It should be noted that all the foregoing embodiments are described by using an example in which the mobile phone is used as the first electronic device and the shortcuts are disposed on the mobile phone. It may be understood that the first electronic device may alternatively be any device in a device group, such as a tablet computer or a notebook computer. This is not limited in the embodiments of this application.

An example is used in which a notebook computer is used as the first electronic device. As shown in FIG. 20(*a*), the device switching button 201 may also be disposed in a status bar 2001 of the notebook computer. When a user browses a web page on the notebook computer, an interface 2002 of a browser is displayed on the notebook computer. If the notebook computer detects that the user selects the device switching button 201 in the status bar 2001, the notebook computer may use the currently running browser as a target application, and display a prompt box 2003 indicating playing across devices for the browser. The prompt box 2003 includes one or more candidate devices for the browser.

Subsequently, if it is detected that the user selects a specific candidate device in the prompt box 2003, for example, a mobile phone 2004, it indicates that the user expects to switch multimedia data output by the browser that is running on the notebook computer to the mobile phone 2004 for playing. In this case, the notebook computer may send a website of a web page currently displayed in the browser to the mobile phone.

After the mobile phone receives the website, as shown in FIG. 20(*b*), if the mobile phone is in an unlocked state, the mobile phone may open the website by using a browser application. Thus, the browser that is running on the notebook computer is switched to the mobile phone for display across devices. As shown in FIG. 20(*c*), if the mobile phone is in a screen locked state, the mobile phone may display, on a lock screen interface, a notification message 2005 of continuing to browse a web page, to prompt the user that the browser running on the notebook computer has been switched to the mobile phone. Subsequently, after the mobile phone receives an unlock operation performed by the user, as shown in FIG. 20(*d*), the mobile phone may automatically open, by using the browser application, the website sent by the notebook computer. Therefore, the browser running on the notebook computer is switched to the mobile phone for playing across devices. Certainly, after the mobile phone is unlocked, an interface that remains before a screen is locked may also be displayed according to the conventional technology. The user may still find, in a message notification bar, the notification message 2005 of continuing to browse a web page. After the user touches the notification message 2005 or starts the browser application, the mobile phone may open the website sent by the notebook computer. This enables the notebook computer to switch the running browser to the mobile phone for playing across devices.

Figure 21:
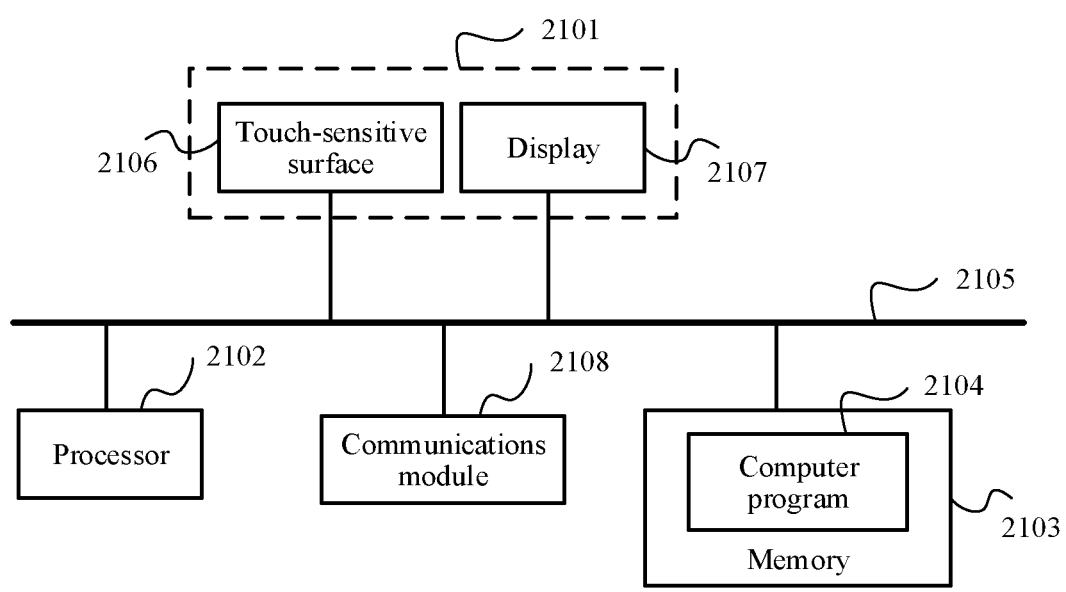
FIG. 21 is a schematic structural diagram 2 of an electronic device according to an embodiment of this application.

As shown in FIG. 21, an embodiment of this application discloses an electronic device, including a touchscreen 2101, one or more processors 2102, a memory 2103, a communications module 2108, one or more application programs (not shown), and one or more computer programs 2104, where the touchscreen 2101 includes a touch-sensitive surface 2106 and a display 2107, and the foregoing components may be connected by using one or more communications buses 2105. The one or more computer programs 2104 are stored in the memory 2103 and are configured to be executed by the one or more processors 2102. The one or more computer programs 2104 include an instruction, and the instruction may be used to perform the steps in the foregoing embodiments.

The foregoing descriptions about implementations allow a person skilled in the art to understand that, for the purpose of convenient and brief description, division into the foregoing functional modules is taken as an example for illustration. In actual application, the foregoing functions can be allocated to different modules and implemented as required, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of the embodiments of this application shall be subject to the protection scope of the claims.

What is claimed is:

1. A method, comprising:
associating a first electronic device with a device group using an account;
displaying a first user interface on the first electronic device;
receiving, while displaying the first user interface, a first user input on the first electronic device:
displaying, in response to the first user input, a floating menu, wherein the floating menu comprises a plurality of control icons for the first electronic device, wherein at least a portion of the first user interface and the floating menu are displayed at a same time, and wherein the plurality of control icons comprises a switching button;
displaying, in response to a second user input on the switching button on the floating menu, a multi-task interface comprising an application window of a first application, wherein the application window comprises a first identifier of first multimedia data, second identifiers of N candidate devices, and third identifiers of types of the N candidate devices, wherein N is an integer greater than zero, wherein the N candidate devices are associated with the device group using the account, and wherein the first electronic device and the N candidate devices are communicatively coupled to a same network;
receiving, from a user, a first selection operation of selecting a second electronic device from the N candidate devices;
running, by the first electronic device, the first application;
continuously sending, in response to the first selection operation, the first multimedia data associated with the first application running on the first electronic device to the second electronic device for playing or displaying on the second electronic device;

receiving, from the user on a touch-sensitive surface of a touchscreen of the first electronic device, a second selection operation of selecting a third electronic device from L candidate devices while sending the first multimedia data to the second electronic device, wherein L is an integer greater than zero; and switching, in response to the second selection operation, the first multimedia data from the second electronic device to the third electronic device by:

stop sending the first multimedia data to the second electronic device when the second selection operation is received on the touch-sensitive surface of the touchscreen of the first electronic device; and sending, after stop sending the first multimedia data to the second electronic device, the first multimedia data associated with the first application to the third electronic device for continuous playing or continuous displaying of the first multimedia data on the third electronic device.

2. The method of claim 1, wherein after sending the first multimedia data to the second electronic device, the method further comprises:

displaying a first interface of a second application;

running the first application while displaying the first interface; and continuing sending the first multimedia data to the second electronic device.

3. The method of claim 2, further comprising displaying a notification indicating that the first electronic device is sending the first multimedia data to the second electronic device.

4. The method of claim 3, wherein receiving, from the user, the second selection operation of selecting the third electronic device from the L candidate devices comprises receiving, from the user, the second selection operation selecting the third electronic device from the N candidate devices.

5. The method of claim 1, further comprising:

displaying a second interface of a third application;

detecting a third selection operation for the switching button;

displaying, in response to the third selection operation, a third interface comprising M candidate devices, wherein M is an integer greater than zero;

receiving a fourth selection operation selecting a fourth electronic device from the M candidate devices; and sending, in response to the fourth selection operation, second multimedia data of the third application to the fourth electronic device for playing or displaying on the fourth electronic device.

6. The method of claim 5, wherein before displaying the third interface, the method further comprises:

detecting a candidate device for the third application; and generating, based on the detecting, the third interface.

7. The method of claim 5, further comprising:

identifying that the first electronic device has not received a fifth selection operation on the third interface within a preset time after displaying the third interface; and hiding, in response to the identifying, the third interface.

8. The method of claim 1, wherein the application window further comprises a snapshot of the first application.

9. An apparatus, comprising:

a non-transitory memory configured to store instructions; and one or more processors coupled to the non-transitory memory, wherein the instructions cause the one or more processors to be configured to:

associate the apparatus with a device group using an account;

display a first user interface on the apparatus;

receive, while displaying the first user interface, a first user input on the apparatus;

display, in response to the first user input, a floating menu, wherein the floating menu comprises a plurality of control icons for the apparatus, wherein at least a portion of the first user interface and the floating menu are displayed at a same time, and wherein the plurality of control icons comprises a switching button;

display, in response to a second user input on the switching button on the floating menu, a multi-task interface comprising an application window of a first application, wherein the application window comprises a first identifier of first multimedia data, second identifiers of N candidate devices, and third identifiers of types of the N candidate devices, wherein N is an integer greater than zero, wherein the N candidate devices are associated with the device group using the account, and wherein the apparatus and the N candidate devices are communicatively coupled to a same network;

receive, from a user, a first selection operation of selecting a second electronic device from the N candidate devices;

run, by the apparatus, the first application;

continuously send, in response to the first selection operation, the first multimedia data associated with the first application running on the apparatus to the second electronic device for playing or displaying on the second electronic device;

receive, from the user on a touch-sensitive surface of a touchscreen of the apparatus, a second selection operation of selecting a third electronic device from L candidate devices while sending the first multimedia data to the second electronic device, wherein L is an integer greater than zero; and switch, in response to the second selection operation, the first multimedia data from the second electronic device to the third electronic device by:

stop sending the first multimedia data to the second electronic device when the second selection operation is received on the touch-sensitive surface of the touchscreen of the apparatus; and sending, after stop sending the first multimedia data to the second electronic device, the first multimedia data associated with the first application to the third electronic device for continuous playing or continuous displaying of the first multimedia data on the third electronic device.

10. The apparatus of claim 9, wherein the instructions further cause the one or more processors to be configured to:

display a first interface of a second application;

run the first application while displaying the first interface; and continue sending the first multimedia data to the second electronic device.

11. The apparatus of claim 10, wherein the instructions further cause the one or more processors to be configured to display a notification indicating that the apparatus is sending the first multimedia data to the second electronic device.

12. The apparatus of claim 11, wherein receive, from the user, the second selection operation of selecting the third electronic device from the L candidate devices comprises receive, from the user, the second selection operation selecting the third electronic device from the N candidate devices.

13. The apparatus of claim 9, wherein the instructions further cause the one or more processors to be configured to:
    display a second interface of a third application;
    detect a third selection operation for the switching button;
    display, in response to the third selection operation, a third interface comprising M candidate devices, wherein M is an integer greater than zero;
    receive a fourth selection operation selecting a fourth electronic device from the M candidate devices; and
    send, in response to the fourth selection operation, second multimedia data of the third application to the fourth electronic device for playing or displaying on the fourth electronic device.

14. The apparatus of claim 13, wherein before displaying the third interface, the instructions further cause the one or more processors to be configured to:
    detect a candidate device for the third application; and
    generate, based on the detecting, the third interface.

15. The apparatus of claim 13, wherein the instructions further cause the one or more processors to be configured to:
    identify that the apparatus does not receive a fifth selection operation on the third interface within a preset time after displaying the third interface; and
    hide, in response to the identifying, the third interface.

16. The apparatus of claim 9, wherein the application window further comprises a snap shot of the first application.

17. The method of claim 1, wherein the account comprises an application account, and wherein associating the first electronic device with the device group comprises logging the first electronic device into the application account.

18. A computer program product comprising instructions stored on a non-transitory computer-readable medium that, when executed by one or more processors, cause an apparatus to:
    associate the apparatus with a device group using an account;
    display a first user interface on the apparatus;
    receive, while displaying the first user interface, a first user input on the apparatus;
    display, in response to the first user input, a floating menu, wherein the floating menu comprises a plurality of control icons for the apparatus, wherein at least a portion of the first user interface and the floating menu are displayed at a same time, and wherein the plurality of control icons comprises a switching button;
    display, in response to a second user input on the switching button on the floating menu, a multi-task interface comprising an application window of a first application, wherein the application window comprises a first identifier of first multimedia data, second identifiers of N candidate devices, and third identifiers of types of the N candidate devices, wherein N is an integer greater than zero, wherein the N candidate devices are associated with the device group using the account, and wherein the apparatus and the N candidate devices are communicatively coupled to a same network;
    receive, from a user, a first selection operation of selecting a second electronic device from the N candidate devices;
    run, by the apparatus, the first application;
    continuously send, in response to the first selection operation, the first multimedia data associated with the first application running on the apparatus to the second electronic device for playing or displaying on the second electronic device;
    receive, from the user on a touch-sensitive surface of a touchscreen of the apparatus, a second selection operation of selecting a third electronic device from L candidate devices while sending the first multimedia data to the second electronic device, wherein L is an integer greater than zero; and
    switch, in response to the second selection operation, the first multimedia data from the second electronic device to the third electronic device by:
        stop sending the first multimedia data to the second electronic device when the second selection operation is received on the touch-sensitive surface of the touchscreen of the apparatus; and
        sending, after stop sending the first multimedia data to the second electronic device, the first multimedia data associated with the first application to the third electronic device for continuous playing or continuous displaying of the first multimedia data on the third electronic device.

19. The method of claim 1, wherein the first application comprises a music application, and wherein sending the first multimedia data comprises continuously sending audio data from the music application running on the first electronic device to the second electronic device for the second electronic device to play the audio data.

20. The apparatus of claim 9, wherein the first application comprises a music application, and wherein sending the first multimedia data comprises continuously sending audio data from the music application running on the apparatus to the second electronic device for the second electronic device to play the audio data.

* * * * *